United States Patent
Sun et al.

(10) Patent No.: US 11,032,818 B2
(45) Date of Patent: Jun. 8, 2021

(54) RADIO-UNLICENSED (NR-U) CHANNEL RESERVATION AT SLOT BOUNDARY

(71) Applicant: QUALCOMM INCORPORATED, San Diego, CA (US)

(72) Inventors: Jing Sun, San Diego, CA (US); Xiaoxia Zhang, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/658,762

(22) Filed: Oct. 21, 2019

(65) Prior Publication Data

US 2020/0145996 A1    May 7, 2020

(30) Foreign Application Priority Data

Nov. 5, 2018  (IN) .............................. 201841041844

(51) Int. Cl.
| | |
|---|---|
| *H04W 72/04* | (2009.01) |
| *H04W 74/08* | (2009.01) |
| *H04W 16/14* | (2009.01) |

(52) U.S. Cl.
CPC ... *H04W 72/0446* (2013.01); *H04W 72/0413* (2013.01); *H04W 74/0808* (2013.01); *H04W 16/14* (2013.01)

(58) Field of Classification Search
CPC ............. H04W 16/14; H04W 72/0413; H04W 72/0446; H04W 74/0808; H04W 74/0816
See application file for complete search history.

(56) References Cited

U.S. PATENT DOCUMENTS

| | | | | |
|---|---|---|---|---|
| 9,407,334 | B2 * | 8/2016 | Toncich | ............... H04B 5/0037 |
| 9,467,957 | B2 * | 10/2016 | Khude | ................ H04W 72/048 |
| 2011/0116401 | A1 * | 5/2011 | Banerjea | ........... H04W 74/0816 |
| | | | | 370/252 |

(Continued)

OTHER PUBLICATIONS

International Search Report and Written Opinion—PCT/US2019/057355—ISA/EPO—dated Jan. 24, 2020.

(Continued)

*Primary Examiner* — Kashif Siddiqui
(74) *Attorney, Agent, or Firm* — Liem T. Do

(57) ABSTRACT

Wireless communications systems and methods related to channel reservations and channel monitoring in a channel shared by multiple network operating entities are provided. A first wireless communication device transmits a first configuration indicating a first set of channel monitoring occasions for a channel. Each channel monitoring occasion of the first set of channel monitoring occasions is aligned to a start of a transmission slot. The first wireless communication device transmits, based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP. The first wireless communication device communicates, with a second wireless communication device, a first communication signal in the channel during the first TXOP.

30 Claims, 10 Drawing Sheets

(56) References Cited

U.S. PATENT DOCUMENTS

2016/0150579 A1* 5/2016 Du .................. H04W 4/06
                                            370/312
2018/0176946 A1  6/2018 Sun et al.
2020/0267699 A1* 8/2020 Zeng ................ H04W 48/16

OTHER PUBLICATIONS

LG Electronics: "Frame Structure for NR Unlicensed Operation", 3GPP Draft, 3GPP TSG RAN WG1 Meeting #94bis, R1-1810266, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517680, 6 Pages, Retrieved from the Internet: URL: http://www.3gpp.org/ftp/tsg%5Fran/WG1%5FRL1/TSGR1%5F94b/Docs/R1%2D1810266%2Ezip [retrieved on Sep. 29, 2018], p. 3-p. 4.

Qualcomm Incorporated: "DL Signals and Channels for NR-U", 3GPP Draft, 3GPP TSG RAN WG1 Meeting #95, R1-1813411 7.2.2.3.1 DL Signals and Channels for NR-U, 3rd Generation Partnership Project (3GPP), Mobile Competence Centre, 650, Route Des Lucioles, F-06921 Sophia-Antipolis Cedex, Fran, vol. RAN WG1, No. Spokane, USA, Nov. 12, 2018-Nov. 16, 2018, Nov. 3, 2018 (Nov. 3, 2018), XP051479733, pp. 1-39, Retrieved from the Internet: URL: http://www.3gpp.org/ftp/tsg%5Fran/WG1%5FRL1/TSGR1%5F95/Docs/R1%2D1813411%2Ezip , [retrieved on Sep. 29, 2018].

* cited by examiner

RADIO-UNLICENSED (NR-U) CHANNEL RESERVATION AT SLOT BOUNDARY

CROSS REFERENCE TO RELATED APPLICATIONS

The present application claims priority to and the benefit of Indian Provisional Patent Application No. 201841041844, filed Nov. 5, 2018, which is hereby incorporated by reference in its entirety as if fully set forth below and for all applicable purposes.

TECHNICAL FIELD

This application relates to wireless communication systems, and more particularly to channel reservations and channel monitoring in a channel shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may perform an LBT by listening to a channel. When the LBT is successful indicating that the channel is available, the transmitting node may transmit a channel reservation signal to reserve a transmission opportunity (TXOP) in the channel. The channel reservation signal may be transmitted at the beginning of the TXOP. The channel reservation signal can silence or block other nearby nodes contending for the channel.

In asynchronous spectrum sharing, LBTs among nodes contending for the channel are asynchronous. Thus, the starting time and/or the completion time of an LBT may be random. A node may complete an LBT at any time and may begin a transmission when the LBT is a pass. As such, a monitoring node is required to perform asynchronous monitoring. The monitoring periodicity is required to be sufficiently high for asynchronous monitoring. The frequent monitoring can cause a high power consumption at the monitoring node.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes transmitting, by a first wireless communication device, a first configuration indicating a first set of channel monitoring occasions for a channel, wherein each channel monitoring occasion of the first set of channel monitoring occasions is aligned to a start of a transmission slot; transmitting, by the first wireless communication device based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and communicating, by the first wireless communication device with a second wireless communication device, a first communication signal in the channel during the first TXOP.

In an additional aspect of the disclosure, a method of wireless communication includes receiving, by a first wireless communication device from a second wireless communication device, a first configuration indicating a first set of channel monitoring occasions for a channel, wherein each channel monitoring occasion of the first set of channel monitoring occasions is aligned to a start of a transmission slot; and monitoring, by the first wireless communication device, for a first channel reservation signal reserving a transmission opportunity (TXOP) in the channel, the first channel reservation signal monitored during one or more channel monitoring occasions of the first set of channel monitoring occasions based on the first configuration.

In an additional aspect of the disclosure, an apparatus includes a transceiver configured to transmit a first configuration indicating a first set of channel monitoring occasions for a channel, wherein each channel monitoring occasion of the first set of channel monitoring occasions is aligned to a start of a transmission slot; transmit, based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and communicate, with a wireless communication device, a first communication signal in the channel during the first TXOP.

In an additional aspect of the disclosure, an apparatus includes a transceiver configured to receive, from a wireless communication device, a first configuration indicating a first set of channel monitoring occasions for a channel, wherein each channel monitoring occasion of the first set of channel monitoring occasions is aligned to a start of a transmission slot; and a processor configured to monitor for a first channel reservation signal reserving a transmission opportunity (TXOP) in the channel, the first channel reservation signal monitored during one or more channel monitoring occasions of the first set of channel monitoring occasions based on the first configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
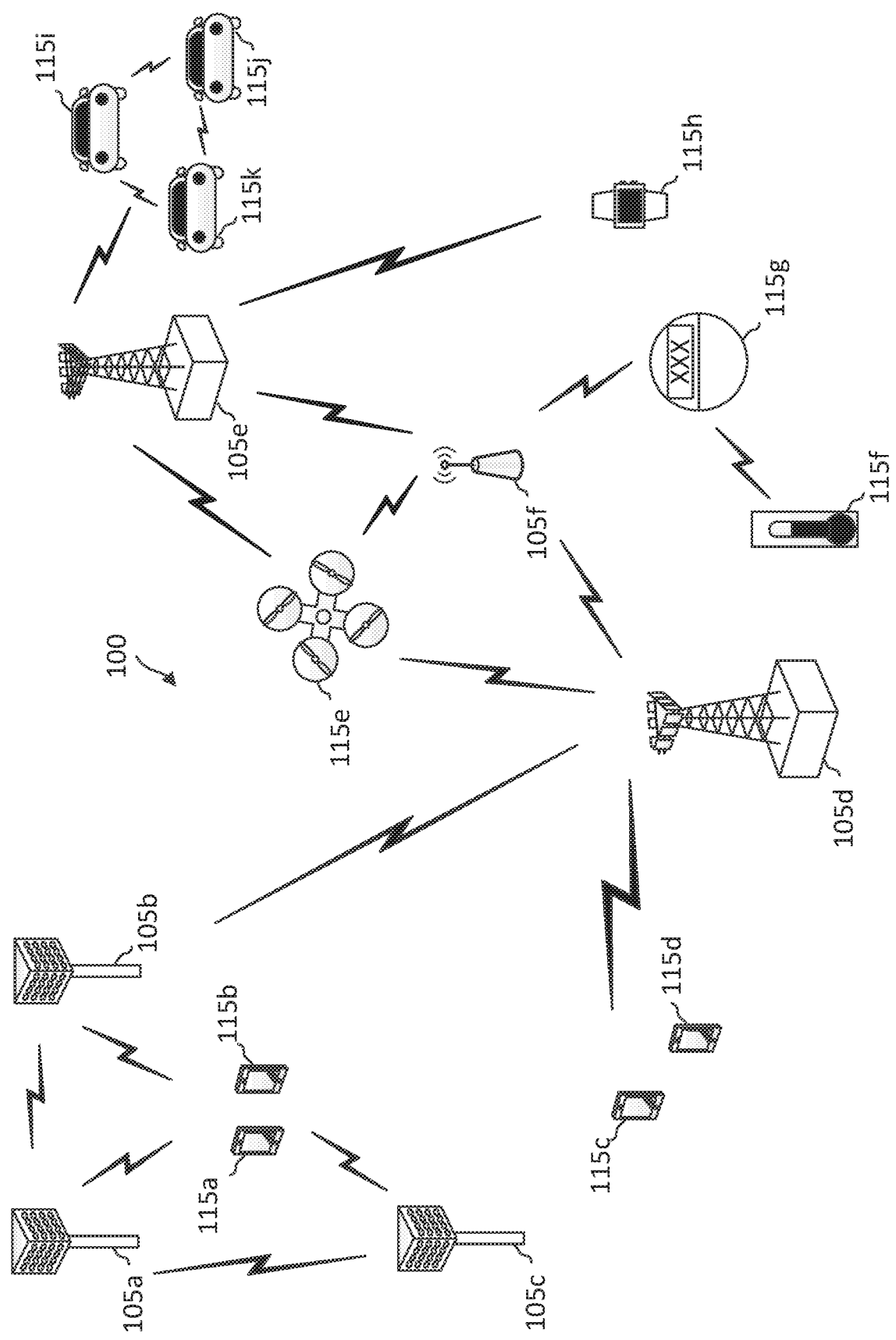
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for channel reservations and channel reservation monitoring in asynchronous spectrum sharing, where a transmission opportunity (TXOP) may start at any time. To reduce the monitoring periodicity at a monitoring node, a transmitting node gaining a TXOP in a channel transmits at least one channel reservation signal during a preconfigured channel monitoring occasion within the TXOP. In other words, the channel reservation signal can be transmitted after the start of the TXOP. The channel reservation signal includes a payload carrying reservation information (e.g., a duration of the TXOP, transmission power levels, and/or interference information) associated with the TXOP. The preconfigured channel monitoring occasions can have a relatively low periodicity (e.g., at a slot-level). Accordingly, a monitoring node may monitor the channel based on preconfigured channel monitoring occasions instead of monitoring the channel at a high frequency (e.g., at a symbol-level). Upon detecting a channel reservation signal from the monitoring, the monitoring node can decode the reservation information from the detected channel reservation signal.

In an embodiment, the transmitting node may further transmit an additional wakeup signal (WUS) at the start of the TXOP. The WUS can be a waveform signal, which can be detected based on a waveform detection (e.g., an autocorrelation) without any decoding. Accordingly, a monitoring node can utilize an always-on waveform component (e.g., a signal detection circuit) to monitor for a WUS indicating the start of a TXOP. The waveform detection component may consume a significantly less amount of power than a channel reservation decoding component. The addition of the WUS transmission can reduce the probability of collisions that may occur during an uncertainty period between the start of a TXOP and the first available preconfigured channel monitoring occasion within the TXOP where the channel reservation signal may be transmitted.

In an embodiment, the transmitting node may further transmit an additional channel reservation signal at the start of the TXOP or during another preconfigured channel monitoring occasions with a higher periodicity. The additional channel reservation signal may also include a payload carrying reservation information associated with the TXOP. To avoid having a monitoring node to perform data decoding at the high-periodicity, the monitoring node may buffer signals received from the channel and perform post-detection after winning a TXOP. Similar to the WUS, the additional channel reservation signal transmission can reduce the collision probability. In an embodiment, the channel signal buffering and post-detection techniques can also be applied to detect for a WUS signal.

To facilitate channel monitoring based on preconfigured channel monitoring occasions, a BS may transmit broadcast communication signal indicating the channel monitoring occasions that are used by the BS. A UE served by the BS may listen for the broadcast communication signal and configures channel monitoring accordingly. The UE may also listen for a broadcast communication signal from a neighboring BS indicating channel monitoring occasions used by the neighboring BS. The UE may report the neighboring BS's preconfigured channel monitoring occasions to the serving BS. Alternatively, the BS may also listen for a broadcast communication signal from a neighboring BS indicating the neighboring BS's channel monitoring occasions. The BS and the UE may perform LBTs based on one or more neighboring BSs' channel monitoring occasions. The UE may monitor for a channel reservation from the serving BS based on serving BS's channel monitoring occasions and communicate with the BS based on scheduling information received during a TXOP of the serving BS.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a BS 105 may perform an LBT in the shared channel. When the LBT passes (the channel is available), the BS 105 may schedule a UE 115 for communications over the shared channel. When the LBT fails (the channel is busy), the BS 105 may backoff and perform another LBT at a later time.

Figure 2:
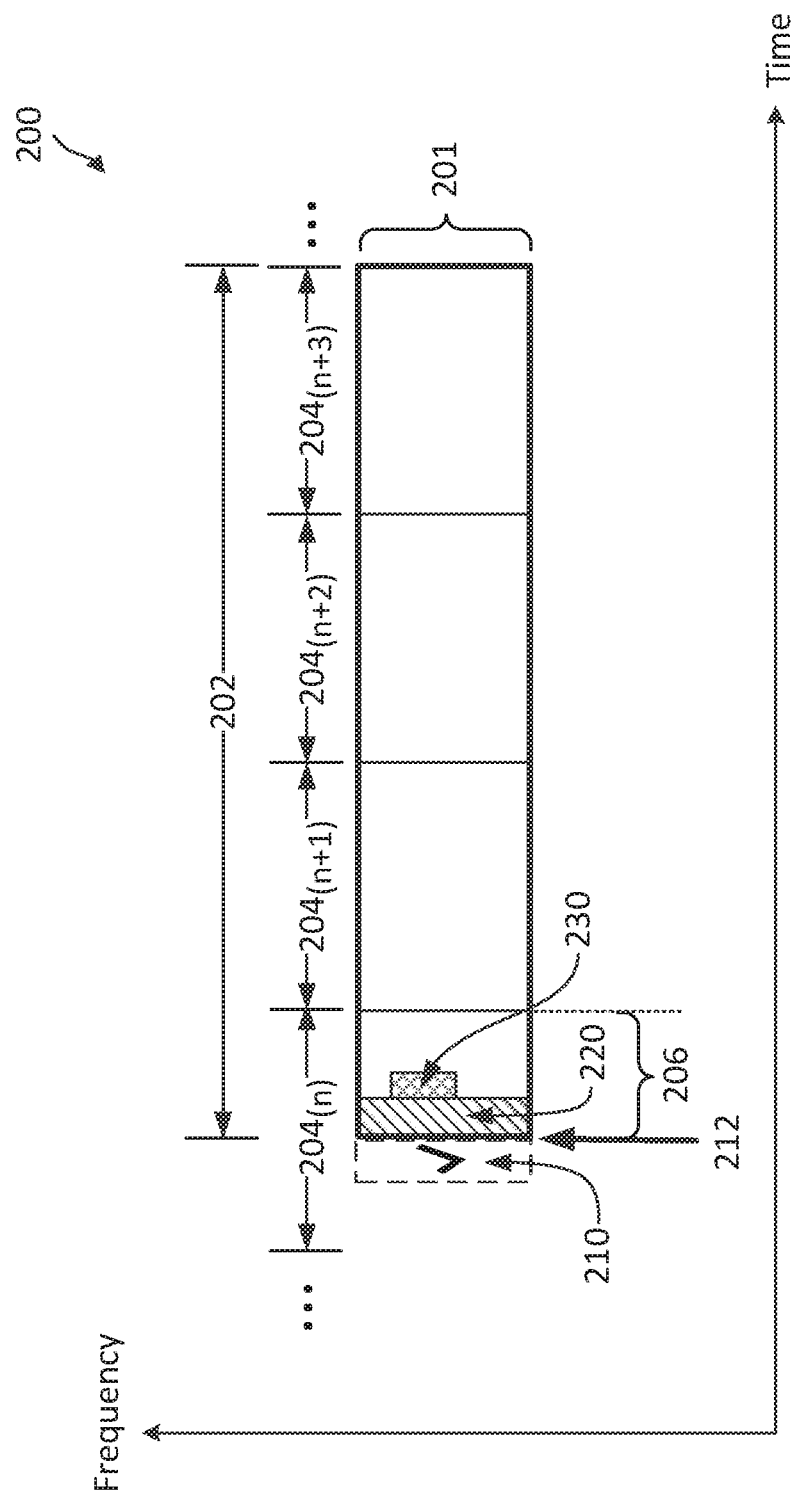
FIG. 2 illustrates a spectrum sharing scheme according to embodiments of the present disclosure.

FIG. 2 illustrates a spectrum sharing scheme 200 according to embodiments of the present disclosure. In FIG. 2, the x-axis represents time in some constant units and the y-axis represents frequency in some constant units. The scheme 200 may be employed by BSs such as the BSs 105 and UEs such as the UEs 115 in a network such as the network 100 to communicate with each other over a frequency band 201. The frequency band 201 may be within a shared spectrum or an unlicensed spectrum. The frequency band 201 may be located at any suitable frequencies. For example, the frequency band 201 may be located at about 3.5 GHz, sub-6 GHz, or at mmWave frequencies. The scheme 200 partitions resources in the frequency band 201 into a plurality of transmission slots 204. The transmission slots 204 may span any suitable duration. In some examples, each transmission slot 204 may include about fourteen OFDM symbols with a normal cyclic prefix (CP). In some other examples, each transmission slot 204 may include about twelve OFDM symbols with an extended CP. In some examples, each transmission slot may span about 1 millisecond (ms).

In the scheme 200, a serving BS may communicate with a UE in units of transmission slots 204. The BS may transmit a scheduling grant to the UE at the beginning of a transmission slot 204. The scheduling grant may indicate UL or DL scheduling information for a current transmission slot 204 or a subsequent transmission slot 204. In some examples, a BS may include a K0 parameter in a DL scheduling grant to indicate a delay between the DL scheduling grant and a corresponding DL transmission (e.g., a PDSCH transmission). Similarly, the BS may include a K2 parameter in a UL scheduling grant to indicate a delay between a UL grant and a corresponding UL data transmission (e.g., a PUSCH transmission).

As described above, an LBT is required prior to a transmission in a shared frequency band or unlicensed frequency band. The scheme 200 uses an asynchronous LBT for spectrum sharing. In other words, a wireless communication node (e.g., a BS or a UE) may contend for a channel (e.g., the frequency band 201) according to the node's timeline. The wireless communication node may start an LBT and complete the LBT at any time, for example, based on a certain contention window and/or a random backoff Upon winning the contention (a successful LBT), the wireless communication node may proceed to transmit over the channel.

As an example, a BS performs an LBT 210 in the frequency band 201 and the LBT 210 is a pass as indicated by the checkmark. To grab the channel after winning the contention, the BS transmits a channel reservation signal 220 to reserve a TXOP 202 in the frequency band 201. The channel reservation signal 220 is transmitted at the beginning of the TXOP 202. The channel reservation signal 220 can include a predetermined waveform. The channel reservation signal 220 can signal to other nodes (e.g., BSs and/or UEs) contending for the channel that the channel is reserved. Thus, the channel reservation signal 220 can block or silence the other nodes. In addition, the channel reservation signal 220 also functions as a wakeup signal (WUS) for UEs served by the BS. For example, a UE may determine when a serving BS won a TXOP by monitoring for a channel reservation signal 220 from the serving BS. After transmitting the channel reservation signal 220, the BS transmits channel usage indication-downlink control information (CUI-DCI) 230 to provide information related to the TXOP 202. The BS may transmit the CUI-DCI 230, for example, on a symbol boundary after transmitting the channel reservation signal 220. The channel reservation signal 220 and the CUI-DCI 230 together may be referred to as a channel reservation.

A TXOP 202 can include one or more full transmission slots 204. As described above, the completion time of an asynchronous LBT can be random. Thus, depending on the completion time of the LBT 210, the TXOP 202 can include a partial transmission slot at the beginning of the TXOP 202. As shown, the LBT 210 passes at a time 212, after the start of the transmission slot $204_{(n)}$. The BS can reserve any suitable number of transmission slots 204 for the TXOP 202. For simplicity of discussion and illustration, the TXOP 202 is shown to include a partial transmission slot $204_{(n)}$ at the beginning of the TXOP 202 followed by three full transmission slots $204_{(n+1)}$, $204_{(n+2)}$, and $204_{(n+3)}$.

The CUI-DCI 230 may be transmitted over a PDCCH. The CUI-DCI 230 is a data payload carrying information bits associated with the TXOP 202. For example, the CUI-DCI 230 can include a reservation duration of the TXOP 202 and/or slot formats for the transmission slots 204 within the TXOP 202. Each transmission slot 204 can have a format of UL, DL, or flexible. The BS may schedule a UE for a UL communication in a transmission slot 204 having a UL format. The BS may schedule a UE for a DL communication in a transmission slot 204 having a DL format. The BS may schedule a UE for a UL or a DL communication in a transmission slot 204 having a flexible format. Thus, the slot format indication can also function as an indication of a duration of the TXOP 202. In the context of NR-U, the BS may transmit the CUI-DCI 230 via a slot format indicator (SFI). In other words, the DCI carrying an SFI in NR can be enhanced to also include TXOP and channel reservation related information.

As such, after the UE detected the channel reservation signal 220 from a serving BS, the UE may wake up and start to monitor for communications (e.g., scheduling information carried in DCIs) from the BS. For example, the UE may monitor for a CUI-DCI 230 from the serving BS in the same transmission slot $204_{(n)}$ where the channel reservation signal 220 is detected. Subsequently, the UE may monitor for scheduling information from the BS during the transmission slots 204 within the TXOP 202. The BS may configure the UE with PDCCH monitoring occasions for schedule monitoring. For example, the BS may configure the UE with a control resource set (CORESET) defining a set of resource blocks (RBs) (e.g., time-frequency resources) where the BS may transmit control information (e.g., DCIs) to the UE. The BS may configure the UE with a search space within the CORESET for monitoring scheduling information from the BS.

In order for a UE to detect the channel reservation signal 220, the UE is required to monitor the channel frequently, for example, at a mini-slot level, which may be as frequent as every symbol. The frequent monitoring can lead to a high power consumption at the UE.

Accordingly, the present disclosure provides techniques to allow a BS to configure a UE with predetermined channel reservation monitoring occasions and delay the transmission of channel reservation information (e.g., the CUI-DCI 230) to a later time within a TXOP using a preconfigured monitoring occasion within the TXOP. Accordingly, a UE can monitor for channel reservation information based on the preconfigured channel reservation monitoring occasions instead of monitoring at a high frequency.

Figure 3:
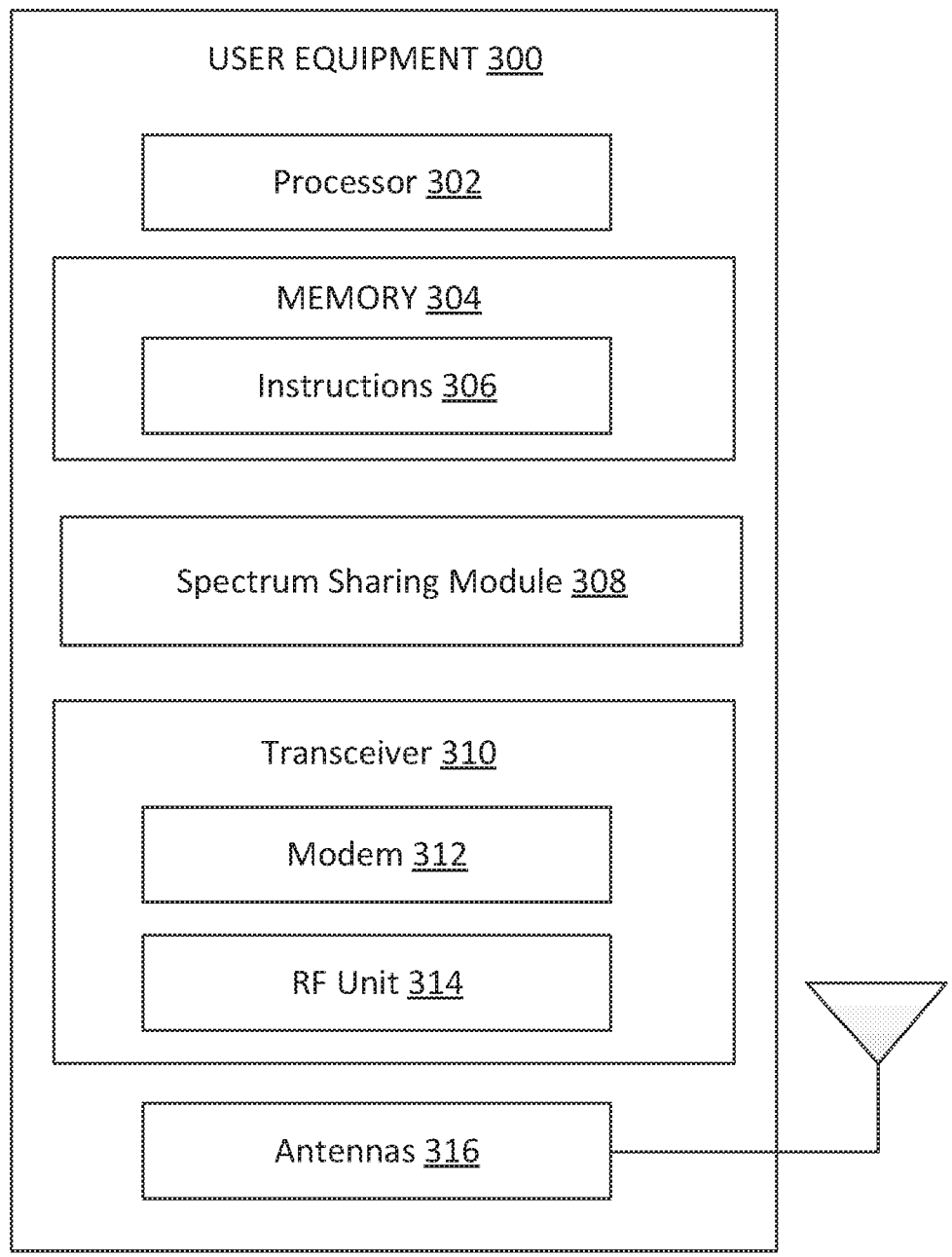
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, a spectrum sharing module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure, for example, aspects of FIGS. 2, 5-8, and 10. Instructions 306 may also be referred to as code. The terms "instructions" and "code"

should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 308 may be implemented via hardware, software, or combinations thereof. For example, the spectrum sharing module 308 may be implemented as a processor, circuit, and/or instructions 306 stored in the memory 304 and executed by the processor 302. The spectrum sharing module 308 may be used for various aspects of the present disclosure, for example, aspects of FIGS. 2, 5-8, and 10. The spectrum sharing module 308 is configured to receive from a serving BS (e.g., the BSs 105) a first configuration indicating first set of channel monitoring occasions, monitor for a channel reservation signal from the serving BS during one or more channel monitoring occasions of the first set of channel monitoring occasions, receive a channel reservation signal (e.g., including a CUI-DCI payload) indicating a TXOP reserved by the serving BS based on the channel reservation monitoring, monitor for a scheduling grant from the serving BS during one or more channel monitoring occasions within the TXOP, receive a scheduling grant from the BS based on the scheduling monitoring, and/or communicate with the serving BS based on the received scheduling grant. The first channel reservation signal may be received in a first channel monitoring occasion of the set of channel monitoring occasions after the TXOP has started. The first set of channel monitoring occasions can have a low periodicity (e.g., in a granularity of a transmission slot 204).

In an embodiment, the spectrum sharing module 308 is further configured to receive a communication signal from the serving BS during a beginning portion of the TXOP before the first channel monitoring occasion, receive a post-scheduling grant during the first channel monitoring occasion indicating information associated with the communication signal received in the beginning portion of the TXOP, and/or decode data from the communication signal based on the scheduling grant.

In an embodiment, the spectrum sharing module 308 is further configured to receive from a neighboring BS a second configuration indicating a second set of channel monitoring occasions for the channel, perform LBTs (e.g., the LBT 210) based on the second configuration, reports the second configuration to the serving BS, and/or communicate with the serving BS further based on the LBTs performed at the UE 300.

In an embodiment, the spectrum sharing module 308 is further configured to monitor for a preamble signal (e.g., a waveform signal) more frequently than the channel monitoring occasions (e.g., at a symbol-level). The spectrum sharing module 308 may include a low-power signal detection component (e.g., autocorrelation-based) for preamble signal monitoring. A node reserving the channel may transmit a preamble signal at the beginning of a TXOP in addition to a channel reservation signal including channel reservation information during a particular channel monitoring occasion. The spectrum sharing module 308 is further configured to determine whether to transmit in the channel based on the preamble signal monitoring. Mechanisms for monitoring channel reservations from a serving BS and/or a neighboring BS are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the spectrum sharing module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
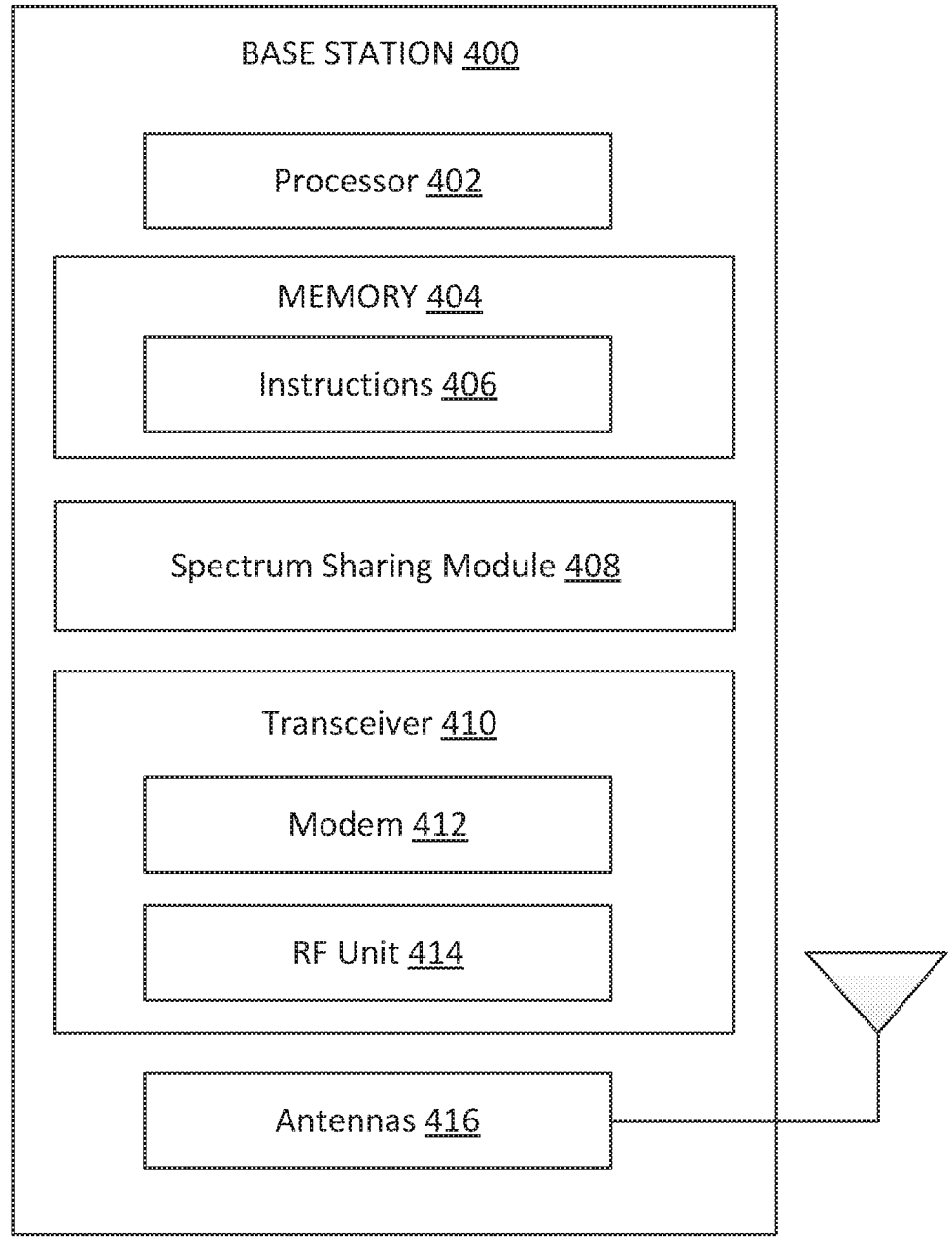
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 as discussed above in FIG. 1. As shown, the BS 400 may include a processor 402, a memory 404, a spectrum sharing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2, 5-10. Instructions 406 may also be referred to as code, which may be interpreted broadly to include any type of computer-readable statement(s) as discussed above with respect to FIG. 3.

The spectrum sharing module 408 may be implemented via hardware, software, or combinations thereof. For example, the spectrum sharing module 408 may be implemented as a processor, circuit, and/or instructions 406 stored in the memory 404 and executed by the processor 302. The spectrum sharing module 408 may be used for various aspects of the present disclosure, for example, aspects of FIGS. 2, 5-10. The spectrum sharing module 408 is configured to configure a UE (e.g., the UEs 115 and 300) served by the BS 400 with a first set of channel monitoring occasions, receive a second set of channel monitoring occasions associated with a neighboring BS, performs LBTs (e.g., the LBT 210) by listening to the channel based the second set of channel monitoring occasions of the neighboring BS, determine whether to access the channel based on the LBTs, transmit a first channel reservation signal (e.g., including a CUI-DCI payload) to reserve a TXOP (e.g., the TXOP 202) in the channel according to the first set of channel monitoring occasions upon a successful LBT, and/or communicate with the UE during the TXOP. The first channel reservation signal may be transmitted in a first channel monitoring occasion of the set of channel monitoring occasions after the TXOP has started. The first set of channel monitoring occasions can have a low periodicity (e.g., in a granularity of a transmission slot 204).

In an example, the spectrum sharing module 408 is further configured to transmit a communication signal during a beginning portion of the TXOP before the first available channel monitoring occasion in the TXOP and transmit a post-scheduling grant during the first channel monitoring occasion indicating information associated with the previously transmitted communication signal.

In an example, the spectrum sharing module 408 is configured to transmit a preamble signal (e.g., a waveform signal) at the beginning of the TXOP to indicate the start of the TXOP in addition to the first channel reservation signal. Similarly, a neighboring BS may transmit a preamble signal to indicate the start of a TXOP reserved by the neighboring BS. The spectrum sharing module 408 may include a low-power signal detection component (e.g., autocorrelation-based) for preamble signal monitoring. The spectrum sharing module 408 is further configured to determine whether to access the channel based on the preamble signal monitoring.

In an embodiment, the spectrum sharing module 408 is configured to transmit a second channel reservation signal (e.g., including a CUI-DCI payload) at the beginning of the TXOP or using a high frequency channel monitoring occasion (e.g., at a symbol-level) to indicate the start of the TXOP in addition to the first channel reservation signal. For example, the second channel reservation signal can reserve a beginning portion of the TXOP before the transmission of the first channel reservation signal. The first channel reservation signal can reserve a remaining portion of the TXOP. Similarly, a neighboring BS may transmit a channel reservation signal at the beginning of a TXOP reserved by the neighboring BS in addition to transmitting a channel reservation signal based on the second set of channel monitoring occasions. Thus, the spectrum sharing module 408 is configured to capture a signal that is in the channel before winning a TXOP, buffer the captured signal (e.g., in the memory 404), and process the captured signal after winning the TXOP to determine whether the captured signal includes a channel reservation signal from the neighboring BS. When the captured signal includes a channel reservation signal from the neighboring BS, the spectrum sharing module 408 is configured to refrain from communicating in the TXOP. Conversely, when the captured signal excludes a channel reservation signal form the neighboring BS, the spectrum sharing module 408 is configured to continue to communicate in the channel during the TXOP. In some embodiment, the spectrum sharing module 408 is configured to apply similar signal buffering and post-signal detection mechanisms for detecting a preamble signal from the neighboring BS. Mechanisms for reserving a channel and performing LBTs in a channel are described in greater detail herein.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 400. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 400 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
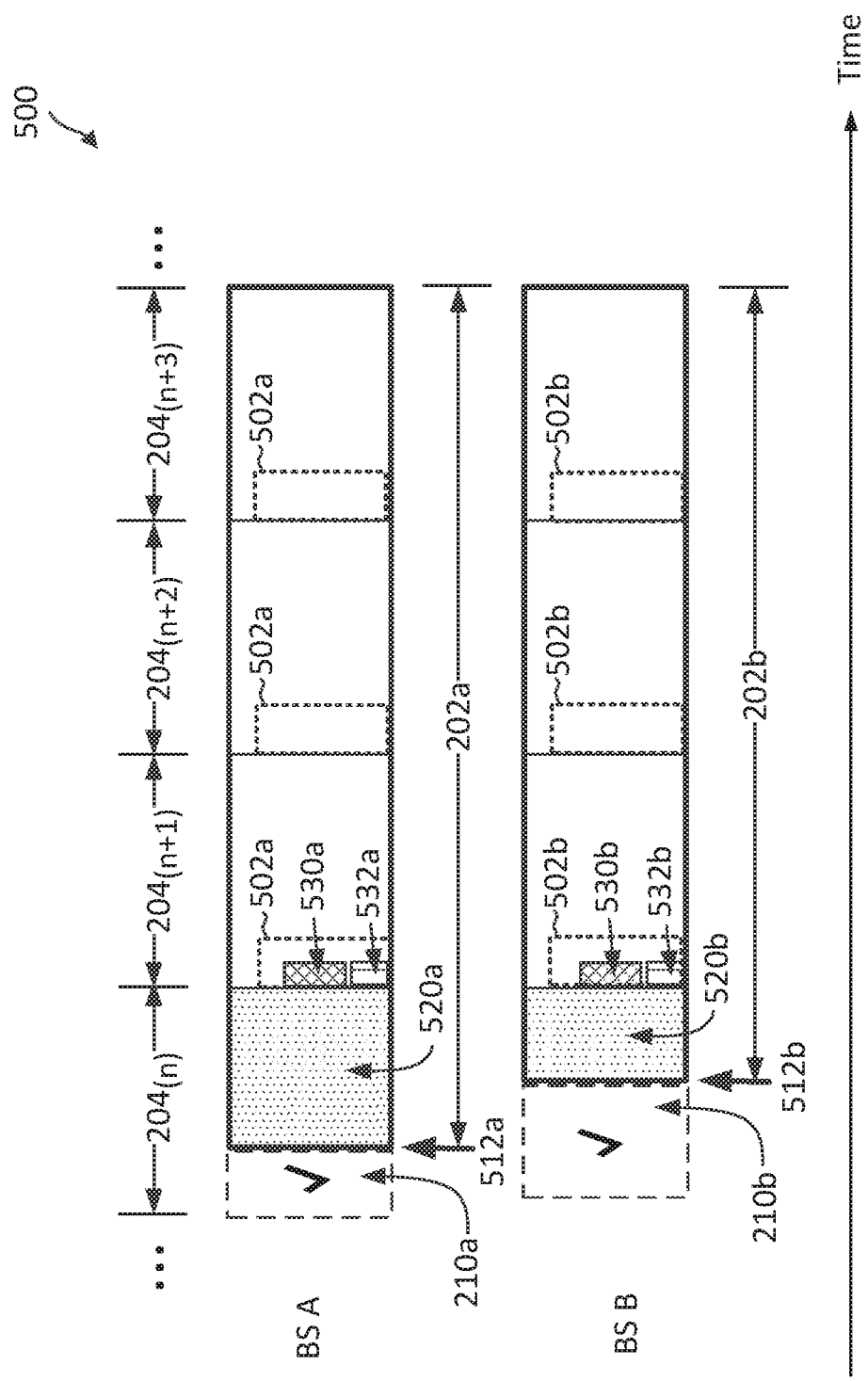
FIG. 5 illustrates a spectrum sharing scheme with preconfigured channel monitoring occasions according to some embodiments of the present disclosure.
Figure 6:
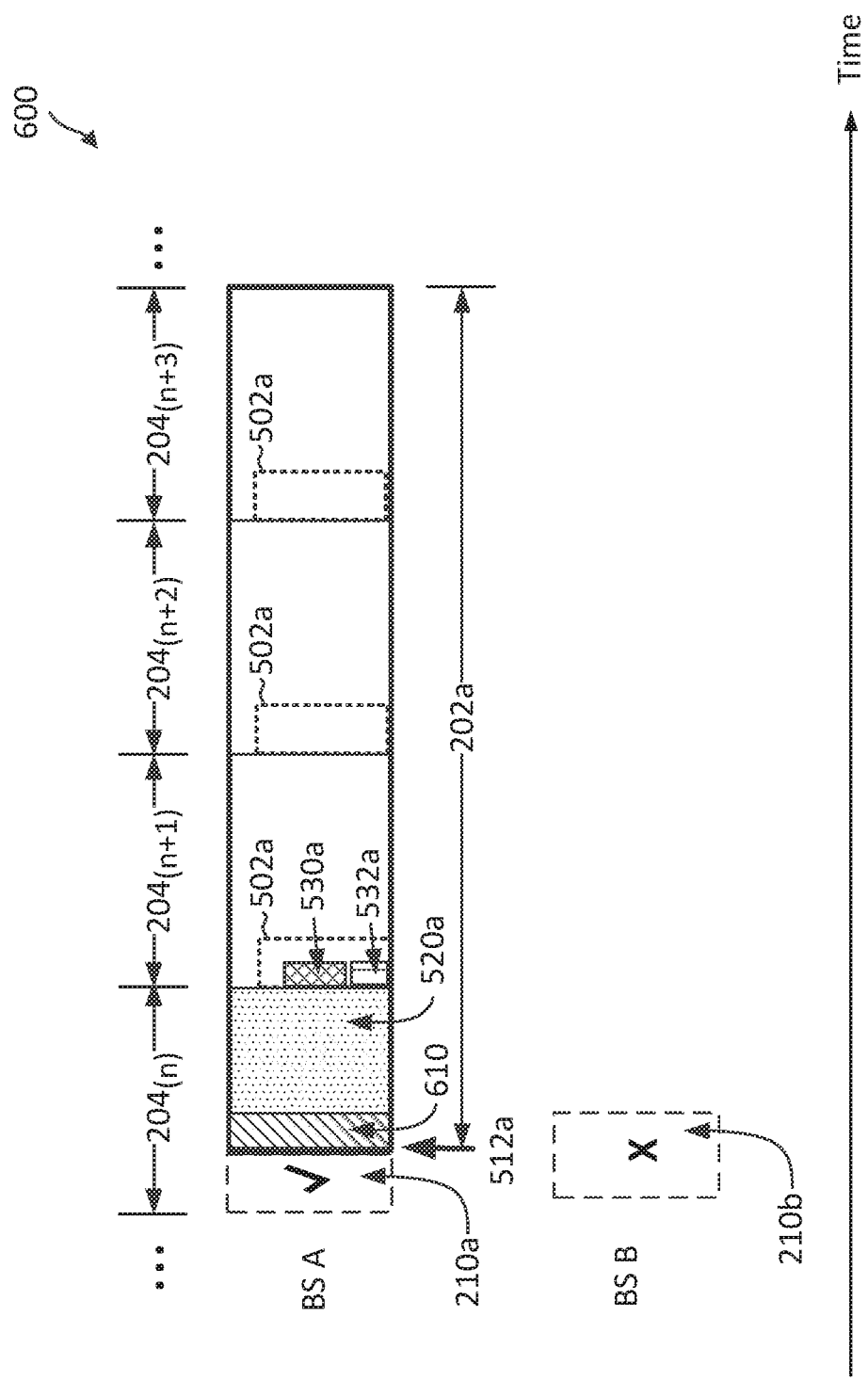
FIG. 6 illustrates a spectrum sharing scheme with preconfigured channel monitoring occasions according to some embodiments of the present disclosure.
Figure 7:
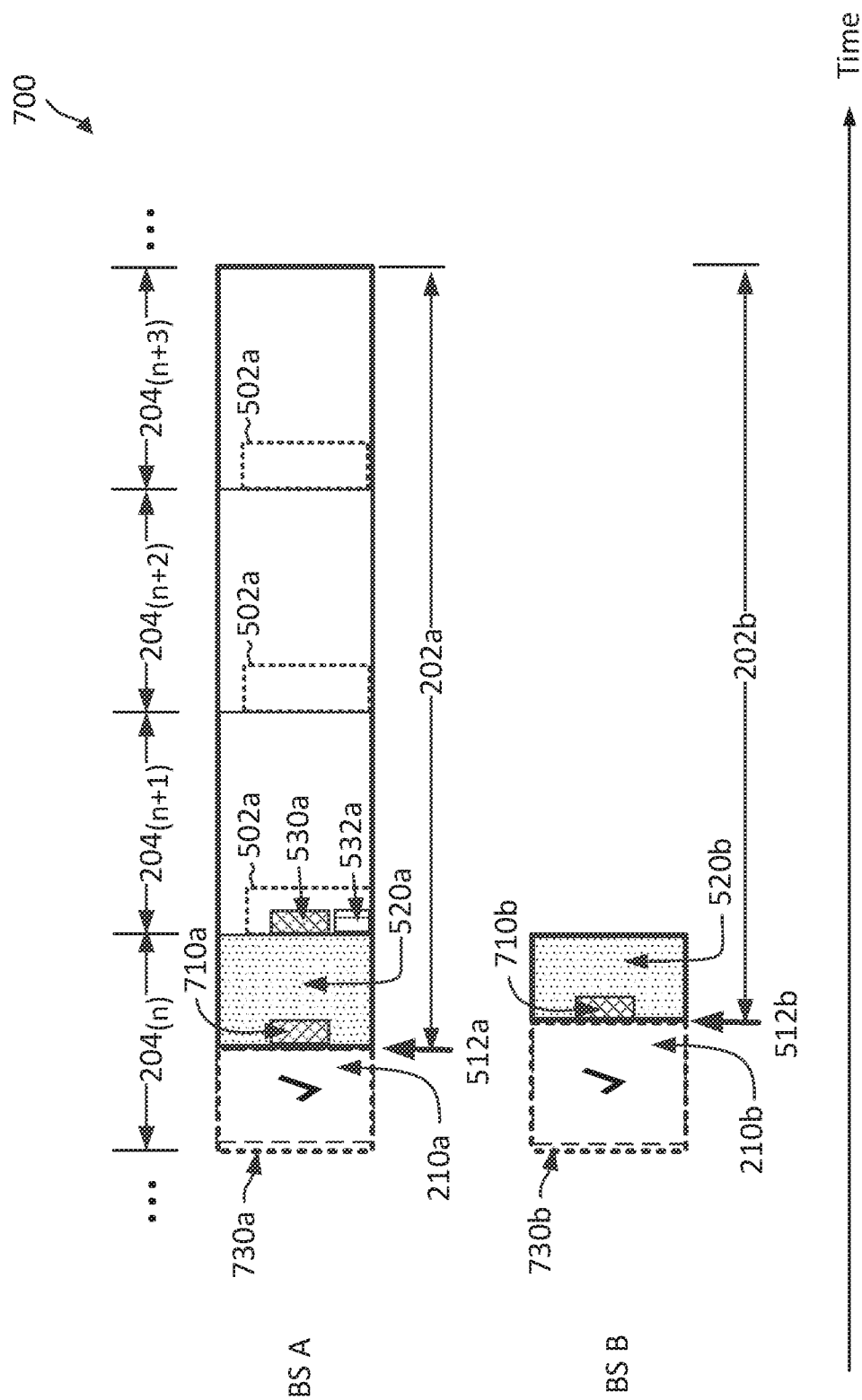
FIG. 7 illustrates a spectrum sharing scheme with preconfigured channel monitoring occasions according to some embodiments of the present disclosure.

FIGS. 5-7 illustrates various mechanisms for channel reservations and channel monitoring with preconfigured channel monitoring occasions. In FIGS. 5-7, the x-axes represent time in some constant units.

FIG. 5 illustrates a spectrum sharing scheme 500 with preconfigured channel monitoring occasions according to some embodiments of the present disclosure. The scheme 500 may be employed by BSs such as the BSs 105 and 400 and UEs such as the UEs 115 and 300 in a network such as the network 100. The scheme 500 is illustrated using a similar slot structure as in the scheme 200, and may use the same reference numerals as in FIG. 2 for simplicity sake. In the scheme 500, a BS configures a UE with a set of channel monitoring occasions 502. Each channel monitoring occasion 502 includes a set of RBs or frequency resource in a particular time period. Upon a successful LBT, the BS transmits a channel reservation signal in a first available channel monitoring occasions 502 instead of at the start of a TXOP 202. Thus, the UE may monitor for a channel reservation signal from the BS during the channel monitoring occasions 502 instead of performing frequent, potentially asynchronous monitoring. For simplicity of illustration and discussion, the channel monitoring occasions 502 are shown to repeat in every transmission slot 204 and aligned to the boundaries or the starts of the transmission slots 204. However, the channel monitoring occasions 502 may be configured to include any suitable periodicity (e.g., more frequent or less frequent) and/or occupy any suitable time-frequency resources (e.g., a different frequency portion and/or a different time portion) within a transmission slot 204.

As an example, a BS A (e.g., the BSs 105 and 400) and a BS B (e.g., the BSs 105 and 400) are neighboring BSs sharing a channel (e.g., the frequency band 201) for communications with corresponding UEs. The BS A may utilize a set of channel monitoring occasions 502a for channel reservation transmissions or other control information transmissions. The BS B may utilize a set of channel monitoring occasions 502b for channel reservation transmissions or other control information transmissions. In some instances, the BS B's channel monitoring occasions 502b may be the same as the BS A's channel monitoring occasions 502a. In some other instances, the BS B's channel monitoring occasions 502b may be different from the BS A's channel monitoring occasions 502a.

For spectrum sharing, the BS A configures a UE A served by the BS A with the channel monitoring occasions 502a. The BS A performs an LBT 210a based on the neighboring BS B's channel monitoring occasions 502b. The LBT 210a can be based on energy detection. The LBT 210a passes at a time 512a. The successful LBT 210a is shown by the checkmark. Upon passing the LBT 210a, the BS A reserves a TXOP 202a in the channel by transmitting a channel reservation signal 530a during a next available channel monitoring occasion 502a within the TXOP 202a. As shown, the TXOP 202a begins after the start of the transmission slot $204_{(n)}$ and the next available channel monitoring occasion 502a is in the next transmission slot $204_{(n+1)}$. In other words, the BS delays the transmission of the channel reservation signal 530a to a later time based on the channel monitoring occasions 502a instead of at the start of the TXOP 202a. The channel reservation signal 530a may include a CUI-DCI payload similar to the CUI-DCIs 230 indicating information associated with the TXOP 202a. For example, the channel reservation signal 530a may indicate a reservation duration of the TXOP 202a, slot formats for transmission slots 204 within the TXOP 202a, transmission power levels and/or ranks used by the BS A, and/or interference tolerance information associated with the BS A. While the TXOP 202a is shown to include a partial transmission slot $204_{(n)}$ followed by three full transmission slots $204_{(n+1)}$, $204_{(n+2)}$, and $204_{(n+3)}$, the TXOP 202a can include any suitable number of transmission slots 204 (e.g., about 2, 4, 5, 6, 10, or more).

The transmission of a channel reservation signal 530a in a pre-configured channel monitoring occasion 502a allows the UE A to perform channel monitoring during the pre-configured channel monitoring occasions 502a instead of performing monitoring at a higher frequency (e.g., at a symbol-level). Thus, the channel monitoring based on the preconfigured channel monitoring occasions 502a can reduce power consumption at the UE.

Upon winning the TXOP 202a, the BS A transmits a communication signal 520a in the partial transmission slot $204_{(n)}$. To enable the UE A to process the communication signal 520a, the BS A transmits a scheduling grant 532a during a channel monitoring occasion 502a within a following transmission slot $204_{(n+1)}$. The BS A can indicate that the scheduling grant 532a is a post-scheduling grant for a previous slot $204_{(n)}$, for example, by setting the parameter K to a value of −1. Subsequently, the BS A may communicate with one or more UEs during the transmission slots $204_{(n+1)}$, $204_{(n+2)}$, and $204_{(n+3)}$. In some embodiments, the BS A may generate a transport block (TB) that is configured for transmission using a full transmission. Depending on the time when the BS A passes the LBT, the BS A may puncture or drop a beginning portion of the TB to form the communication signal 520a so that the communication signal 520a can be transmitted within the partial transmission slot $204_{(n)}$.

Upon detecting the channel reservation signal 530a, the UE A may know that the serving BS A won the TXOP 202a. The UE A can decode the CUI-DCI from the channel reservation signal 530a to obtain reservation information (e.g., a reservation period) associated with the TXOP 202a. The UE A can collect and buffer a signal received from the channel during the transmission slot $204_{(n)}$, for example, in a memory such as the memory 304. The UE A may continue to monitor for a communication from the serving BS. Upon receiving the scheduling grant 532a, the UE A may decode data from the collected or buffered signal base on the received scheduling grant 532a.

Similarly, the BS B may employ similar LBT and communication mechanisms as the BS A. For example, the BS B configures the UE B with a set of channel monitoring occasions 502b. The BS B performs an LBT 210b based on the neighboring BS A's channel monitoring occasions 502a. In general, both the BS A and the BS B may perform LBT by monitoring each other's CUI-DCI from during each other's channel monitoring occasions 502 when performing LBTs. Upon receiving a CUI-DCI from the other BS, the BS A or the BS B may refrain from transmission for a period of time reserved by the CUI-DCI.

The BS B may determine that the LBT 210b is a pass at a time 512b within the transmission slot $204_{(n)}$ as shown by the checkmark. As can be seen, while the BS A's TXOP 202a started in the transmission slot 204 when the BS B is performing the LBT 210b, the delayed transmission of the channel reservation signal 530a cannot block the BS B from accessing the channel. Thus, the BS B proceeds to reserve a TXOP 202b in the channel by transmitting a channel reservation signal 530b (e.g., including CUI-DCI) in a next available channel monitoring occasion 502b within the TXOP 202b. While the BS A does transmit the channel reservation signal 530a, the BS B may not be able to detect the channel reservation signal 530a when the BS B transmits the channel reservation signal 530b at the same time. Thus, the channel reservation signal 530a may not be able to block the BS B from accessing the channel as well.

After gaining the TXOP 202b, the BS B transmits a communication signal 520b in the partial transmission slot $204_{(n)}$ before transmitting the channel reservation signal 530b. The BS B transmits a scheduling grant 532b in a next transmission slot $204_{(n+1)}$ to provide the UE B with post-scheduling information associated with the communication signal 520b. Since the BS B fails to detect the channel reservation by the BS A, the transmissions from the BS B and/or the UE B in the TXOP 202b collide with the transmissions from the BS A and/or the UE A.

Thus, the scheme 500 may have a higher collision rate than the scheme 200. However, the scheme 500 can reduce the required channel monitoring frequency for asynchronous LBTs by a significant amount, for example, from a symbol-level monitoring to a slot-level monitoring. Accordingly, the scheme 500 may be applicable to monitoring nodes or UEs where a low power consumption is desirable.

In an embodiment, to enable other nodes to monitor for the channel reservation signal 530a for coexistence, the BS A may broadcast configuration information associated with the channel monitoring occasions 502a. The configuration information may include a CORESET configuration and a search space configuration. The COREST configuration indicates a set of frequency resources or RBs. The search space configuration indicates time instances when the set of frequency resources or RBs may carry channel reservation information. Similarly, the BS B may broadcast information associated with the channel monitoring occasions 502b.

In the context of 5G or NR, the configuration information can be carried in an RMSI signal and the search space configuration may be an SFI search space configuration. The CORESET configuration and/or the SFI search space configuration can be predetermined or dynamically configured. In an embodiment, a UE may monitor for an RMSI signal from a neighboring cell or a neighboring BS. The UE may obtain a CORESET configuration and an SFI search space configuration from an RMSI signal received from neighboring BS. The UE can report the CORESET configuration and the SFI search space configuration of the neighboring BS to a serving BS to facilitate LBTs at the serving BS. In an embodiment, a BS may monitor for an RMSI signal from a neighboring BS. The BS may identify the neighboring BS's channel monitoring occasions based on a CORESET configuration and an SFI search space configuration in a received RMSI signal.

FIG. 6 illustrates a spectrum sharing scheme 600 with preconfigured channel monitoring occasions according to some embodiments of the present disclosure. The scheme 600 may be employed by BSs such as the BSs 105 and 400 and UEs such as the UEs 115 and 300 in a network such as the network 100. The scheme 600 is substantially similar to the scheme 500, but a BS may transmit a preamble signal 610 at the start of a TXOP 202 in addition to a channel reservation signal 530 in a channel monitoring occasion 502. The scheme 600 is illustrated using the same contention scenario as in the scheme 500, where the BS A and the BS B contend for a TXOP in the channel, and may use the same reference numerals as in FIGS. 2 and 5.

As shown, upon passing the LBT 210a, the BS A transmits a preamble signal 610 at the start of the TXOP 202a (e.g., the time 512a within the transmission slot $204_{(n)}$ in addition to transmitting the channel reservation 530a in the next available channel monitoring occasion 502a within the TXOP 202a. The preamble signal 610 can be substantially similar to the WUS or channel reservation signal 220. The preamble signal 610 can block a node that passes an LBT at a later time within the same transmission slot 204.

When the BS B performs the LBT 210b with a countdown (e.g., based on a random backoff), the BS B may detect the BS A's preamble signal 610. As such, the BS B's LBT 210b fails as marked by the "X" symbol. The BS B may refrain from transmitting in the channel and yield channel access to the BS A. The BS B may wait for the next available channel monitoring occasion 502a (e.g., in the transmission slot $204_{(n+1)}$) to decode the CUI-DCI from the channel reservation signal 530a. Upon receiving the BS A's channel reservation signal 530a, the BS B may decode the channel reservation signal 530a to obtain information (e.g., a reservation duration) associated with the TXOP 202a and retry LBT based on the reservation duration. Compared to the scheme 200, there may be a gap time between the transmission of a preamble signal 610 and a channel reservation signal 530 reserving the same TXOP 202. Note that when the BS B detected a preamble signal 610a from the BS A, but did not detect a corresponding CUI-DCI 530a in the following channel monitoring occasion 502a, the BS B may continue to contend for the channel after the channel monitoring occasion 502a.

Since the preamble signal 610a is a waveform signal, a monitoring node can detect the preamble signal 610a using a dedicated component (e.g., an autocorrelation circuitry) and the detection can be relatively fast. While the signal detection circuitry may be required to be powered-on continuously while a monitoring node is in operation, the signal detection circuitry can be operated using a significantly less amount of power than a signal decoding component required for processing and decoding the channel reservation signal 530. Accordingly, the scheme 600 can have a lower collision rate than the scheme 500 while providing low-periodicity channel reservation monitoring and low power consumption at a monitoring node. For example, nodes that are actively performing LBT for channel access may monitor the channel continuously for a preamble signal 610 in addition to monitoring for CUI-DCI 530, while nodes that are not pursuing LBT procedure for channel access may only monitor the for CUI-DCI 530 at the configured channel monitoring occasions 502. This thus saves power for UEs that are not actively pursuing LBT.

FIG. 7 illustrates a spectrum sharing scheme 700 with preconfigured channel monitoring occasions according to some embodiments of the present disclosure. The scheme 700 may be employed by BSs such as the BSs 105 and 400 and UEs such as the UEs 115 and 300 in a network such as the network 100. The scheme 700 is substantially similar to the scheme 500, but a BS reserving a TXOP 202 may transmit an additional channel reservation signal 710, for example, at the start of the TXOP 202 or during another channel monitoring occasion that has a higher periodicity than the channel monitoring occasions 502. In addition, a monitoring BS may perform post-processing to detect for a channel reservation signal 710 from a neighboring BS instead of performing continuous preamble monitoring. The scheme 700 is illustrated using the same contention scenario as in the schemes 500 and 600, where the BS A and the BS B contend for a TXOP in the channel, and may use the same reference numerals as in FIGS. 2 and 5. For simplicity of illustration and discussion, FIG. 7 illustrates the scenario where an additional channel reservation signal (e.g., a channel reservation signal 710a or 710b) is transmitted at the start of a TXOP. However, similar mechanisms may be applied to an additional channel reservation signal transmitted during the high-periodicity channel monitoring occasion located at a different portion of the TXOP before the first available channel monitoring occasion 502 in the TXOP.

As shown, upon passing the LBT 210a, the BS A transmits a channel reservation signal 710a at the start of the TXOP 202a (e.g., the time 512a within the transmission slot $204_{(n)}$) in addition to transmitting the channel reservation 530a in the next available channel monitoring occasion 502a within the TXOP 202a. The channel reservation signal 710a can be substantially similar to the channel reservation signal 530a. For example, the channel reservation signal 710a can include a CUI-DCI payload similar to the CUI-DCI 230. The channel reservation signal 710a and the channel reservations signal 530a can include different information associated with the TXOP 202a. The channel reservation signal 710a may reserve a portion of the TXOP 202a, indicating a duration of the partial transmission slot $204_{(n)}$ within the TXOP 202a. The channel reservation signal 530a may reserve a remaining portion of the TXOP 202a, indicating a duration of the transmission slots $204_{(n+1)}$, $204_{(n+2)}$, and $204_{(n+3)}$ within the TXOP 202a or a full duration of the TXOP 202a.

The BS B utilizes post-detection techniques for the detection of the channel reservation signal 710a outside of the channel monitoring occasions 502a. Thus, the BS B performs the LBT 210b without monitoring the channel outside of the channel monitoring occasions 502a. Thus, the BS B may not detect the channel reservation signal 710a from the BS A and may determine that the LBT 210b is a pass at the time 512b. The BS B transmits the channel reservation signal 710b to reserve a TXOP 202b in the channel. However, the BS B may continuously receive and buffer signals from the channel so that upon passing the LBT 210b, the BS B may post-process the buffered signal 730b (e.g., collected signal samples) received during a time period before the time 512b. Upon detecting the channel reservation signal 710a from the buffered signal 730b, the BS B may refrain from transmitting in the channel during the TXOP 202b. In other words, the BS B abandons or terminates the TXOP 202b after the detection of the BS A's channel reservation signal 710a. Similarly, the BS A may buffer received signals prior to wining the TXOP 202a and perform post-detection on a buffered signal 730a after winning the TXOP 202a.

In an embodiment, when the BS A passes an LBT 210a towards the end of a transmission slot $204_{(n)}$, the BS A may not have enough time to process a buffered signal 730a before the start of the next transmission slot 204. In such an embodiment, the BS A may transmit a channel reservation signal 710a at the start of a TXOP 202 and a first channel reservation signal 530a during a channel monitoring occasion 502a in a next transmission slot $204_{(n+1)}$. After the BS A processes the buffer signal 730a and determines that there is no channel reservation signal 530b detected from the neighboring BS B, the BS A transmits an additional second channel reservation signal 530a during a channel monitoring occasion 502a in a subsequent transmission slot $204_{(n+2)}$. The first channel reservation signal 530a may reserve a first portion of the TXOP 202, for example, the portion till the next channel monitoring occasion 502a, where the BS A may finish processing the buffered samples by the next channel monitoring occasion 502a. The second channel reservation signal 530a may reserve a remaining duration of the TXOP 202, for example, the transmission slots $204_{(n+2)}$ and $204_{(n+3)}$.

Thus, in the scheme 700, a monitoring node may perform channel monitoring at the low-periodicity (e.g., slot-level monitoring) channel monitoring occasion 502 and may only perform the high-periodicity (e.g., symbol-level monitoring) monitoring in the transmission slot 204 when the node won the contention. Accordingly, the scheme 700 can have a similar performance as the scheme 600, but may eliminate the need for an always-on signal detection component and thereby saving power at a monitoring node. It should be noted that depending on the time required for the processing of a buffer signal 730, some collisions can occur during the uncertain period while the buffered signal is being processed. However, the probability and duration of overlap may be relatively low and thus may not significantly degrade the performance.

In an embodiment, the buffering and post-detection mechanisms described in the scheme 700 may be applied to the scheme 600 for post-preamble detection to eliminate the need for an always-on signal detection component.

In an embodiment, a BS (e.g., the BSs 105 and 400) implementing the scheme 200 may include a frontend (e.g., the RF unit 414) that is powered-on to collect signals (e.g., signal samples) from a channel (e.g., the frequency band 201) and save the collected signals to a buffer (e.g., the memory 404). The BS includes an always-on circuitry and/or component (e.g., an autocorrelation circuit) for quick detection of a waveform-based channel reservation signal 220. After detecting a channel reservation signal 220, the full receive and/or decode processing circuitry and/or components (e.g., in spectrum sharing module 408) can be powered-on to process the CUI-DCI 230 following the channel reservation signal 220.

In an embodiment, a BS (e.g., the BSs 105 and 400) implementing the scheme 500 may include frontend (e.g., the RF unit 414) that is powered-on to collect signals (e.g., signal samples) and save the collected signals to a buffer. There is no need for the BS to include a dedicated component for WUS detection since there is no WUS transmission in the scheme 500. The BS may be configured to detect and/or decode CUI-DCI from a channel reservation signal 530 of a neighboring cell at the preconfigured channel monitoring occasions 502 of the neighboring cell.

In an embodiment, a BS (e.g., the BSs 105 and 400) implementing the scheme 600 or 700 may include frontend (e.g., the RF unit 414) that is powered-on to collect signals (e.g., signal samples) from a channel (e.g., the frequency band 201) and save the collected signals to a buffer (e.g., the memory 404). The BS can include an always-on circuitry and/or component (e.g., an autocorrelation circuit) for quick detection of a preamble signal 610. After detecting a preamble signal 610 from a neighboring cell, the BS can wait for the next configured channel monitoring occasion 502 of the neighboring cell to monitor for CUI-DCI (e.g., the channel reservation signal 530). In some instances, some processing in the receive path (e.g., fast Fourier transform) can be moved forward. After detecting CUI-DCI from the neighboring cell, the BS may apply non-causal processing to process the data (in the buffered signal) in the previous transmission slot 204. The BS may have to perform some processing in a shorter period of time to meet a timing requirement due to the delayed-processing of the buffered signal. Alternatively, the BS may take the higher processing delay into account in the implementation.

Figure 8:
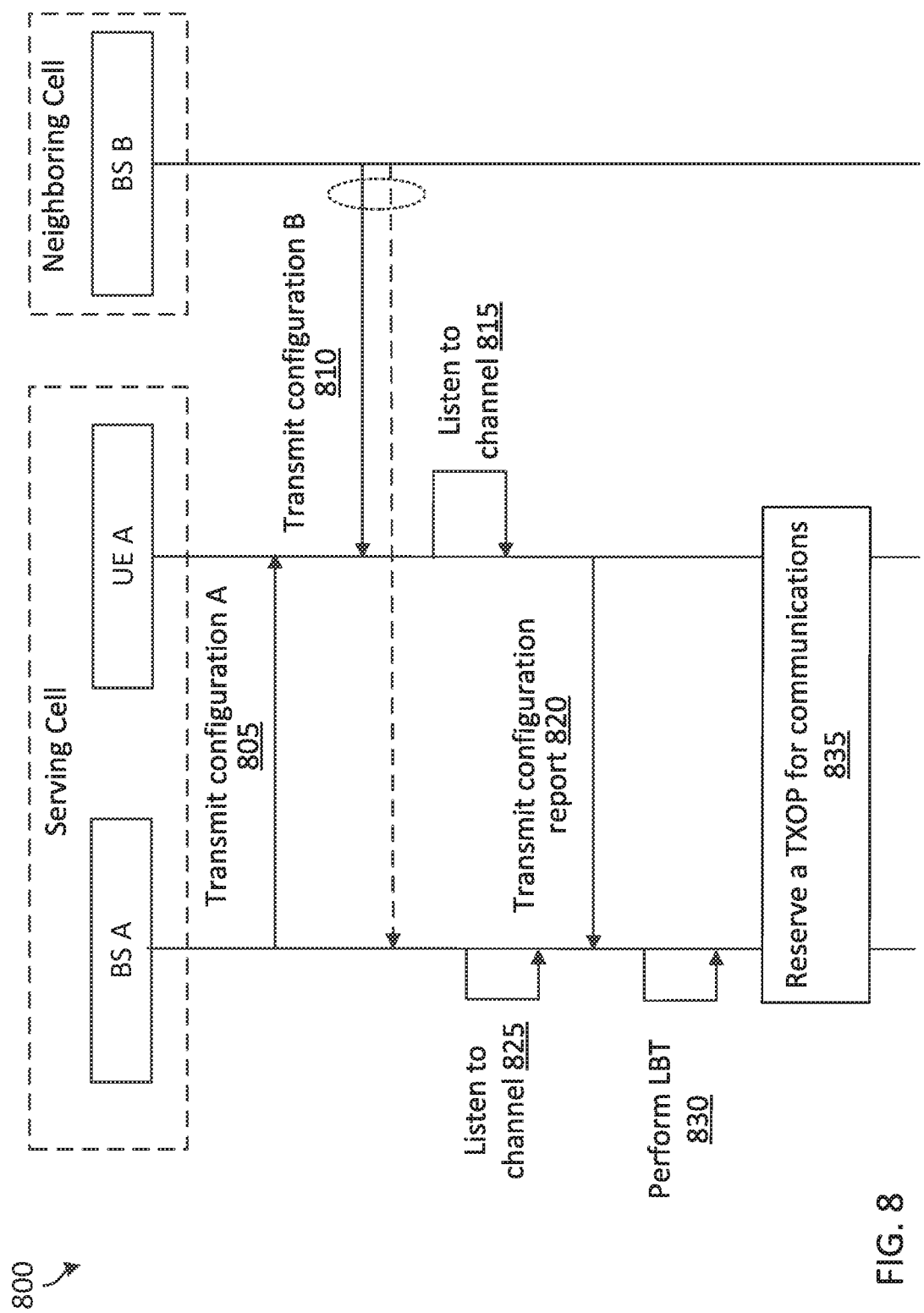
FIG. 8 is a signaling diagram illustrating a communication method with preconfigured channel monitoring occasions according to some embodiments of the present disclosure.

FIG. 8 is a signaling diagram illustrating a communication method 800 with preconfigured channel monitoring occasions according to some embodiments of the present disclosure. The method 800 is implemented by a BS A serving a UE A in a serving cell and a BS B in a neighboring cell in a network over an unlicensed spectrum (e.g., the frequency band 201). The BS A and the BS B are similar to the BSs 105 and 400. The UE A is similar to the UEs 115 and 300. The network is similar to the network 100. The method 800 may use similar mechanisms as in the schemes 500, 600, and 700 described above with respect to FIGS. 5, 6, and 7, respectively. Steps of the method 800 can be executed by computing devices (e.g., a processor, processing circuit, and/or other suitable component) of the BS A, BS B, and the UE A. As illustrated, the method 800 includes a number of enumerated steps, but embodiments of the method 800 may include additional steps before, after, and in between the enumerated steps. In some embodiments, one or more of the enumerated steps may be omitted or performed in a different order.

At step 805, the BS A transmits a configuration A indicating a first set of channel monitoring occasions (e.g., the channel monitoring occasions 502a) for monitoring a channel reservation signal from the BS A. The configuration A may be carried in a broadcast communication signal (e.g., an RMSI signal). The configuration A may include a CORESET configuration and an SFI search space configuration.

At step 810, the BS A transmits a configuration B indicating a second set of channel monitoring occasions (e.g., the channel monitoring occasions 502b) for monitoring a channel reservation signal from the BS B. Similarly, the configuration B may be carried in a broadcast communication signal and may include a CORESET configuration and an SFI search space configuration.

At step 815, the UE A listens to the channel or a broadcast communication signal from the serving cell and the neighboring cell. The UE receives the configuration A from the serving BS and the configuration B from the neighboring BS.

At step 820, the UE A transmits a configuration report to the serving BS A to facilitate LBTs (e.g., the LBTs 210) at the serving BS A. The configuration report includes the configuration B of the neighboring cell.

At step 825, the BS A may also listen to the channel for a broadcast communication signal from the neighboring BS and receive the configuration B from the neighboring BS.

At step 830, the BS A performs an LBT based on the configuration B. The BS A may monitor for a channel reservation signal (e.g., the channel reservation signals 530) from the BS B in the second set of channel monitoring occasions as described in the schemes 500, 600, and 700. The BS A may monitor for a WUS or a preamble signal (e.g., the preamble signal 610) from the BS B, for example, using a signal detection component, as described in the scheme 600. The BS A may buffer signals received from the channel and perform post-detection as described in the scheme 700.

At step 835, upon a successful LBT, the BS A reserves a TXOP (e.g., the TXOP 202) for communications with the UE A. The BS A may reserve the TXOP by transmitting a channel reservation signal (e.g., the channel reservation signal 530a) based on the first set of channel monitoring occasions as described in the schemes 500, 600, and 700. The BS A may further transmit a preamble signal (e.g., the preamble signal 610) to indicate the start of the TXOP or an additional channel reservation signal (e.g., the channel reservation signal 710a) at the start of the TXOP or based on a channel monitoring occasion (e.g., at a symbol-level) with a higher periodicity than the first set of channel monitoring occasions.

Figure 9:
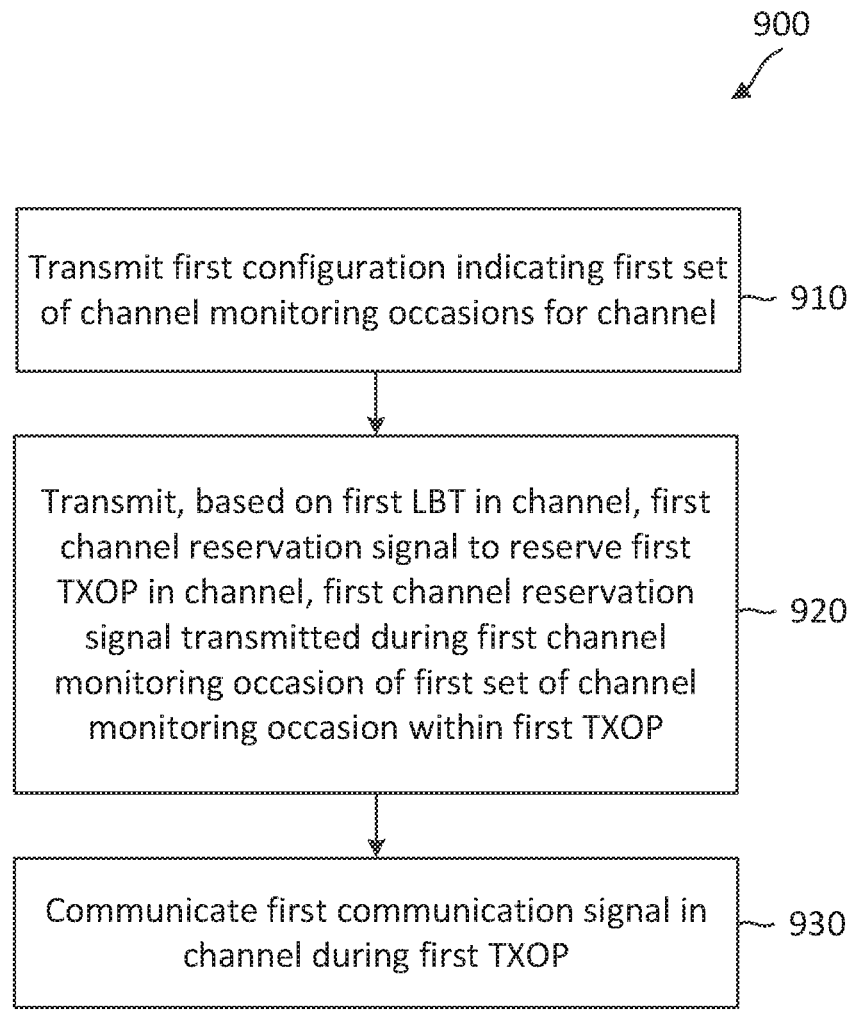
FIG. 9 is a flow diagram of a communication method with preconfigured channel monitoring occasions according to some embodiments of the present disclosure.

FIG. 9 is a flow diagram of a communication method 900 with preconfigured channel monitoring occasions according to some embodiments of the present disclosure. Steps of the method 900 can be executed by a computing device (e.g., a processor, processing circuit, and/or other suitable component) of a wireless communication device or other suitable means for performing the steps. For example, a wireless communication device, such as the BSs 105 and/or BS 400, may utilize one or more components, such as the processor 402, the memory 404, the spectrum sharing module 408, the transceiver 410, and the one or more antennas 416, to execute the steps of method 900. The method 900 may employ similar mechanisms as in the schemes 500, 600, and 700 and the method 800 described with respect to FIGS. 5, 6, 7, and 8, respectively. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes transmitting, by a first wireless communication device, a first configuration indicating a first set of channel monitoring occasions (e.g., the channel monitoring occasions 502) for a channel (e.g., the frequency band 201).

At step 920, the method 900 includes transmitting, by the first wireless communication device based on a first LBT (e.g., the LBTs 210) in the channel, a first channel reservation signal (e.g., the channel reservation signals 530) to reserve a first TXOP (e.g., the TXOP 202) in the channel. The first channel reservation signal is transmitted during a first channel monitoring occasion of the first set of channel monitoring occasions that is within the first TXOP.

At step 930, the method 900 includes communicating, by the first wireless communication device with a second wireless communication device, a first communication signal in the channel during the first TXOP.

The first wireless communication device corresponds to a BS and the second wireless communication device corresponds to a UE served by the BS.

In an embodiment, each channel monitoring occasion of the first set of channel monitoring occasions is aligned to a start of a transmission slot (e.g., the transmission slots 204). In an embodiment, the first TXOP includes a partial transmission slot (e.g., in the transmission slot $204_{(n)}$) at a beginning of the TXOP followed by one or more full transmission slots. The first channel monitoring occasion is located within a first full transmission slot (e.g., in the transmission slot $204_{(n+1)}$) of the one or more full transmission slots.

In an embodiment, the first wireless communication device communicates the first communication signal by transmitting the first communication signal (e.g., the communication signal 520) before communicating the first channel reservation signal. In an embodiment, the first wireless communication device further transmits scheduling information (e.g., the scheduling grant 532) associated with the first communication signal during the first channel monitoring occasion.

In an embodiment, the first wireless communication device further transmits a second channel reservation signal (e.g., the preamble signal 610 or the channel reservation signal 710) before transmitting the first channel reservation signal. The second channel reservation signal can be transmitted at a beginning of the first TXOP. The second channel reservation signal can be transmitted during a channel monitoring occasion of a second set of channel monitoring occasions that is within the first TXOP. The first set of channel monitoring occasions includes a first periodicity (e.g., at a slot-level). The second set of channel monitoring occasions includes a second periodicity different from the first periodicity (e.g., at a symbol-level). The first channel reservation signal includes first channel usage information associated (e.g., the CUI-DCIs 230) with the first TXOP and the second channel reservation signal includes at least one of a preamble signal (e.g., the preamble signal 610) or second channel usage information (e.g., the CUI-DCIs 230) associated with the first TXOP.

In an embodiment, the first wireless communication device further receives a signal (e.g., the signal 730) from the channel during a time period before the first LBT. The first wireless communication device determines, by after passing the first LBT, whether the received signal includes a second channel reservation signal of a neighboring cell. The first channel reservation signal is transmitted when the received signal is determined to exclude the second channel reservation signal.

In an embodiment, the first wireless communication device further transmits, based on a second LBT (e.g., the LBTs 210), a second channel reservation signal (e.g., the channel reservation signals 530) to reserve a first portion of a second TXOP (e.g., the TXOP 202) in the channel, the second channel reservation signal transmitted during a time period outside of the first set of channel monitoring occasions. The second TXOP is different from the first TXOP. The first wireless communication device receives a signal (e.g., the signal 730) from the channel during a time period before passing the second LBT. The first wireless communication device further determines, after passing the second LBT, whether the received signal includes a third channel reservation signal of a neighboring cell. The first wireless communication device refrains from communicating in a remaining portion of the second TXOP after determining that the received signal includes the third channel reservation signal.

In embodiment, the first wireless communication device further performs the first LBT by monitoring, for a second channel reservation signal from a neighboring cell reserving a second TXOP in the channel. The second channel reservation signal monitored during one or more channel monitoring occasions of a second set of channel monitoring occasions associated with the neighboring cell. Each channel monitoring occasion of the second set of channel monitoring occasions is aligned to a start of a transmission slot. In an embodiment, the first wireless communication device further receives a second configuration indicating the second set of channel monitoring occasions.

In an embodiment, the first channel reservation signal is transmitted in a PDCCH (e.g., in an SFI search space of the PDCCH). In an embodiment, the first configuration is transmitted in a broadcast communication signal (e.g., an RMSI signal).

Figure 10:
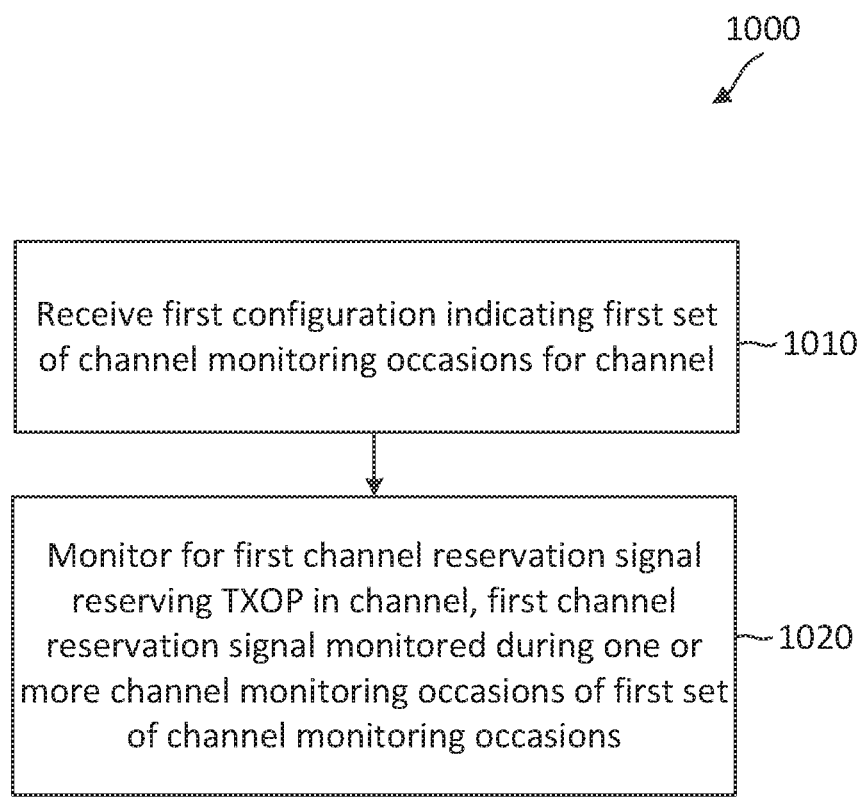
FIG. 10 is a flow diagram of a communication method with preconfigured channel monitoring occasions according to some embodiments of the present disclosure.

FIG. 10 is a flow diagram of a communication method 1000 with preconfigured channel monitoring occasions according to some embodiments of the present disclosure. Steps of the method 1000 can be executed by a computing device (e.g., a processor, processing circuit, and/or other suitable component) of a wireless communication device or other suitable means for performing the steps. For example, a wireless communication device, such as the UEs 115 and/or 300, may utilize one or more components, such as the processor 302, the memory 304, the spectrum sharing module 308, the transceiver 310, and the one or more antennas 316, to execute the steps of method 1800. In another example, a wireless communication device, such as the BSs 105 and/or 400, may utilize one or more components, such as the processor 402, the memory 404, the spectrum sharing module 408, the transceiver 410, and the one or more antennas 416, to execute the steps of method 1000. The method 1000 may employ similar mechanisms as in the schemes 500, 600, and 700 and the method 800 described with respect to FIGS. 5, 6, 7, and 8, respectively. As illustrated, the method 1000 includes a number of enumerated steps, but embodiments of the method 900 may include additional steps before, after, and in between the enumerated steps. In some embodiments, one or more of the enumerated steps may be omitted or performed in a different order.

At step 1010, the method 1000 includes receives, by a first wireless communication device from a second wireless communication device, a first configuration indicating a first set of channel monitoring occasions (e.g., the channel monitoring occasions 502) for a channel (e.g., the frequency band 201).

At step 1020, the method 1000 includes monitoring, by the first wireless communication device, for a first channel reservation signal (e.g., the channel reservation signal 530) reserving a TXOP in the channel. The first channel reservation signal is monitored during one or more channel monitoring occasions of the first set of channel monitoring occasions based on the first configuration.

In an embodiment, the first wireless communication device corresponds to a UE and the second wireless communication device corresponds to a BS. In an embodiment, the first wireless communication device corresponds to a first BS and the second wireless communication device corresponds to a second BS in a neighboring cell of the first BS.

In an embodiment, each channel monitoring occasion of the first set of channel monitoring occasions is aligned to a start of a transmission slot.

In an embodiment, the first wireless communication device receives the first channel reservation signal during a first channel monitoring occasion of the first set of channel monitoring occasions from the monitoring. The first wireless communication device further receives, from the second wireless communication device, a communication signal (e.g., the communication signal 520) before receiving the first channel reservation signal. The first wireless communication device further receives, from the second wireless communication device, scheduling information (e.g., the scheduling grants 532) after receiving the communication signal. The first wireless communication device further recovers data from the received communication signal based on the scheduling information.

In an embodiment, the first wireless communication device detects channel usage information (e.g., the CUI-DCIs 230) associated with the TXOP from the monitoring.

In an embodiment, the first wireless communication device further monitors for a second channel reservation signal. The second channel reservation signal is monitored during a time period outside of the first set of channel monitoring occasions. In an embodiment, the first wireless communication device detects at least one of a preamble signal (e.g., the preamble signal 610) or channel usage information (e.g., CUI-DCI in the channel reservation signal 710) associated with the TXOP. In an embodiment, the first wireless communication device detects the second channel reservation signal at a beginning of the TXOP. In an embodiment, the first wireless communication device detects the second channel reservation signal during a channel monitoring occasion of a second set of channel monitoring occasions that is within the TXOP. The first set of channel monitoring occasions includes a first periodicity (e.g., at a slot-level). The second set of channel monitoring occasions includes a second periodicity (e.g., at a symbol-level) different from the first periodicity.

In an embodiment, the first wireless communication device further refrains from communicating in the TXOP when the first channel reservation signal is detected by the monitoring.

In an embodiment, the first wireless communication device further receives, from a BS of a neighboring cell, a second configuration indicating a second set of channel monitoring occasions for the neighboring cell.

In an embodiment, when the second wireless communication device is a serving base station of the first wireless communication device, the first wireless communication device further transmits, to the second wireless communication device, the second configuration.

In an embodiment, the first wireless communication device monitors for the first channel reservation signal from a PDCCH.

In an embodiment, the first wireless communication device receives the first configuration from a broadcast communication signal (e.g., an RMSI signal).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including transmitting, by a first wireless communication device, a first configuration indicating a first set of channel monitoring occasions for a channel; transmitting, by the first wireless communication device based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and communicating, by the first wireless communication device with a second wireless communication device, a first communication signal in the channel during the first TXOP.

The method may also include where each channel monitoring occasion of the first set of channel monitoring occasions is aligned to a start of a transmission slot. The method may also include where the first TXOP includes a partial transmission slot at a beginning of the TXOP followed by one or more full transmission slots, and where the first channel monitoring occasion is located within a first full transmission slot of the one or more full transmission slots. The method may also include where the communicating includes transmitting, by the first wireless communication device to the second wireless communication device, the first communication signal before communicating the first channel reservation signal. The method may also include further includes transmitting, by the first wireless communication device to the second wireless communication device, scheduling information associated with the first communication signal during the first channel monitoring occasion. The method may also include transmitting, by the first wireless communication device, a second channel reservation signal before transmitting the first channel reservation signal. The method may also include where the transmitting the second channel reservation signal includes transmitting, by the first wireless communication device, the second channel reservation signal at a beginning of the first TXOP. The method may also include where the transmitting the second channel reservation signal includes transmitting, by the first wireless communication device, the second channel reservation signal during a channel monitoring occasion of a second set of channel monitoring occasions that is within the first TXOP, where the first set of channel monitoring occasions includes a first periodicity, and where the second set of channel monitoring occasions includes a second periodicity different from the first periodicity. The method may also include where the first channel reservation signal includes first channel usage information associated with the first TXOP, and where the second channel reservation signal includes at least one of a preamble signal or second channel usage information associated with the first TXOP. The method may also include where the first channel reservation signal and the second channel reservation signal reserve different portions of the TXOP. The method may also include receiving, by the first wireless communication device, a signal from the channel during a time period before the first LBT; and determining, by the first wireless communication device after passing the first LBT, whether the received signal includes a second channel reservation signal, where the transmitting the first channel reservation signal includes transmitting, by the first wireless communication device, the first channel reservation signal when the received signal is determined to exclude the second channel reservation signal. The method may also include transmitting, by the first wireless communication device based on a second LBT, a second channel reservation signal to reserve a first portion of a second TXOP in the channel, the second channel reservation signal transmitted during a time period outside of the first set of channel monitoring occasions, the second TXOP being different from the first TXOP; receiving, by the first wireless communication device, a signal from the channel during a time period before passing the second LBT; determining, by the first wireless communication device after passing the second LBT, whether the received signal includes a third channel reservation signal; and refraining, by the first wireless communication device, from communicating in a remaining portion of the second TXOP after determining that the received signal includes the third channel reservation signal. The method may also include performing, by the first wireless communication device, the first LBT by monitoring, for a second channel reservation signal reserving a second TXOP in the channel, the second channel reservation signal monitored during one or more channel monitoring occasions of a second set of channel monitoring occasions associated with a neighboring cell, where each channel monitoring occasion of the second set of channel monitoring occasions is aligned to a start of a transmission slot. The method may also include receiving, by the first wireless communication device, a second configuration indicating the second set of channel monitoring occasions. The method may also include where the transmitting the first channel reservation signal includes transmitting, by the first wireless communication device, the first channel reservation signal in a physical downlink control channel (PDCCH). The method may also include where the transmitting the first configuration includes transmitting, by the first wireless communication device, a broadcast communication signal including the first configuration.

Further embodiments of the present disclosure include a method of wireless communication, including receiving, by a first wireless communication device from a second wireless communication device, a first configuration indicating a first set of channel monitoring occasions for a channel; and monitoring, by the first wireless communication device, for a first channel reservation signal reserving a transmission opportunity (TXOP) in the channel, the first channel reservation signal monitored during one or more channel monitoring occasions of the first set of channel monitoring occasions based on the first configuration.

The method may also include where each channel monitoring occasion of the first set of channel monitoring occasions is aligned to a start of a transmission slot. The method may also include where the monitoring includes receiving, by the first wireless communication device, the first channel reservation signal during a first channel monitoring occasion of the first set of channel monitoring occasions, and where the method further includes receiving, by the first wireless communication device from the second wireless communication device, a communication signal before receiving the first channel reservation signal; receiving, by the first wireless communication device from the second wireless communication device, scheduling information after receiving the communication signal; and recovering, by the first wireless communication device, data from the received communication signal based on the scheduling information. The method may also include where the monitoring includes detecting, by the first wireless communication device, channel usage information associated with the TXOP. The method may also include monitoring, by the first wireless communication device, for a second channel reservation signal, the second channel reservation signal monitored during a time period outside of the first set of channel monitoring occasions. The method may also include where the monitoring for the second channel reservation signal includes detecting, by the first wireless communication device, at least one of a preamble signal or channel usage information associated with the TXOP. The method may also include where the monitoring for the second channel reservation signal includes detecting, by the first wireless communication device, the second channel reservation signal at a beginning of the TXOP. The method may also include where the monitoring for the second channel reservation signal includes detecting, by the first wireless communication device, the second channel reservation signal during a channel monitoring occasion of a second set of channel monitoring occasions that is within the TXOP, where the first set of channel monitoring occasions includes a first periodicity, and where the second set of channel monitoring occasions includes a second periodicity different from the first periodicity. The method may also include refraining, by the first wireless communication device, from communicating in the TXOP when the first channel reservation signal is detected by the monitoring. The method may also include receiving, by the first wireless communication device from a base station of a neighboring cell, a second configuration indicating a second set of channel monitoring occasions for the neighboring cell. The method may also include transmitting, by the first wireless communication device to the second wireless communication device, the second configuration, where the second wireless communication device is a serving base station of the first wireless communication device. The method may also include where the monitoring includes monitoring, by the first wireless communication device, for the first channel reservation signal in a physical downlink control channel (PDCCH). The method may also include where the receiving includes receiving, by the first wireless communication device from the second wireless communication device, a broadcast communication signal including the first configuration.

Further embodiments of the present disclosure include an apparatus including a transceiver configured to transmit a first configuration indicating a first set of channel monitoring occasions for a channel; transmit, based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and communicate, with a wireless communication device, a first communication signal in the channel during the first TXOP.

The apparatus may also include where each channel monitoring occasion of the first set of channel monitoring occasions is aligned to a start of a transmission slot. The apparatus may also include where the first TXOP includes a partial transmission slot at a beginning of the TXOP followed by one or more full transmission slots, and where the first channel monitoring occasion is located within a first full transmission slot of the one or more full transmission slots. The apparatus may also include where the transceiver is further configured to communicate the first communication signal before communicating the first channel reservation signal. The apparatus may also include where the transceiver is further configured to transmit, to the wireless communication device, scheduling information associated with the first communication signal during the first channel monitoring occasion. The apparatus may also include where the transceiver is further configured to transmit a second channel reservation signal before transmitting the first channel reservation signal. The apparatus may also include where the transceiver is further configured to transmit the second channel reservation signal at a beginning of the first TXOP. The apparatus may also include where the transceiver is further configured to transmit the second channel reservation signal during a channel monitoring occasion of a second set of channel monitoring occasions that is within the first TXOP, where the first set of channel monitoring occasions includes a first periodicity, and where the second set of channel monitoring occasions includes a second periodicity different from the first periodicity. The apparatus may also include where the first channel reservation signal includes first channel usage information associated with the first TXOP, and where the second channel reservation signal includes at least one of a preamble signal or second channel usage information associated with the first TXOP. The apparatus may also include where the first channel reservation signal and the second channel reservation signal reserve different portions of the TXOP. The apparatus may also include where the transceiver is further configured to receive a signal from the channel during a time period before the first LBT, where the apparatus further includes a processor configured to determine, after passing the first LBT, whether the received signal includes a second channel reservation signal, and where the transceiver is further configured to transmit the first channel reservation signal when the received signal is determined to exclude the second channel reservation signal. The apparatus may also include where the transceiver is further configured to transmit, based on a second LBT, a second channel reservation signal to reserve a first portion of a second TXOP in the channel, the second channel reservation signal transmitted during a time period outside of the first set of channel monitoring occasions, the second TXOP being different from the first TXOP; and receiving a signal from the channel during a time period before passing the second LBT, and where the apparatus further includes a processor configured to determine, after passing the second LBT, whether the received signal includes a third channel reservation signal; and refrain from communicating in a remaining portion of the second TXOP after determining that the received signal includes the third channel reservation signal. The apparatus may also include a processor configured to perform the first LBT by monitoring, for a second channel reservation signal reserving a second TXOP in the channel, the second channel reservation signal monitored during one or more channel monitoring occasions of a second set of channel monitoring occasions associated with a neighboring cell, where each channel monitoring occasion of the second set of channel monitoring occasions is aligned to a start of a transmission slot. The apparatus may also include where the transceiver is further configured to receive a second configuration indicating the second set of channel monitoring occasions. The apparatus may also include where the transceiver is further configured to transmit the first channel reservation signal in a physical downlink control channel (PDCCH). The apparatus may also include where the transceiver is further configured to transmit the first configuration by transmitting a broadcast communication signal including the first configuration.

Further embodiments of the present disclosure include an apparatus including a transceiver configured to receive, from a wireless communication device, a first configuration indicating a first set of channel monitoring occasions for a channel; and a processor configured to monitor for a first channel reservation signal reserving a transmission opportunity (TXOP) in the channel, the first channel reservation signal monitored during one or more channel monitoring occasions of the first set of channel monitoring occasions based on the first configuration.

The apparatus may also include where each channel monitoring occasion of the first set of channel monitoring occasions is aligned to a start of a transmission slot. The apparatus may also include where the transceiver is further configured to receive the first channel reservation signal during a first channel monitoring occasion of the first set of channel monitoring occasions by the monitoring; receive, from the wireless communication device, a communication signal before receiving the first channel reservation signal; and receive, from the wireless communication device, scheduling information after receiving the communication signal, and where the processor is further configured to recover data from the received communication signal based on the scheduling information. The apparatus may also include where the processor is further configured to detect channel usage information associated with the TXOP from the monitoring. The apparatus may also include where the processor is further configured to monitor for a second channel reservation signal during a time period outside of the first set of channel monitoring occasions. The apparatus may also include where the processor is further configured to detect at least one of a preamble signal or channel usage information associated with the TXOP from the monitoring for the second channel reservation signal. The apparatus may also include where the processor is further configured to detect the second channel reservation signal at a beginning of the TXOP from the monitoring for the second channel reservation signal. The apparatus may also include where the processor is further configured to detect the second channel reservation signal during a channel monitoring occasion of a second set of channel monitoring occasions that is within the TXOP from the monitoring for the second channel reservation signal, where the first set of channel monitoring occasions includes a first periodicity, and where the second set of channel monitoring occasions includes a second periodicity different from the first periodicity. The apparatus may also include where the processor is further configured to refrain from communicating in the TXOP when the first channel reservation signal is detected by the monitoring. The apparatus may also include where the transceiver is further configured to receive, from a base station of a neighboring cell, a second configuration indicating a second set of channel monitoring occasions for the neighboring cell. The apparatus may also include where the transceiver is further configured to transmit, to the wireless communication device, the second configuration, and where the wireless communication device is a serving base station of the apparatus. The apparatus may also include where the processor is further configured to monitor for the first channel reservation signal in a physical downlink control channel (PDCCH). The apparatus may also include where the transceiver is further configured to receive the first configuration by receiving, from the wireless communication device, a broadcast communication signal including the first configuration.

Further embodiments of the present disclosure include a non-transitory computer-readable medium having program code recorded thereon, the program code including code for causing a first wireless communication device to transmit a first configuration indicating a first set of channel monitoring occasions for a channel; code for causing the first wireless communication device to transmit, based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and code for causing the first wireless communication device to communicate, with a second wireless communication device, a first communication signal in the channel during the first TXOP.

The non-transitory computer-readable medium may also include where each channel monitoring occasion of the first set of channel monitoring occasions is aligned to a start of a transmission slot. The non-transitory computer-readable medium may also include where the first TXOP includes a partial transmission slot at a beginning of the TXOP followed by one or more full transmission slots, and where the first channel monitoring occasion is located within a first full transmission slot of the one or more full transmission slots. The non-transitory computer-readable medium may also include where the code for causing the first wireless communication device to communicate the first communication signal is further configured to transmit, to the second wireless communication device, the first communication signal before communicating the first channel reservation signal. The non-transitory computer-readable medium may also include further includes code for causing the first wireless communication device to transmit, to the second wireless communication device, scheduling information associated with the first communication signal during the first channel monitoring occasion. The non-transitory computer-readable medium may also include code for causing the first wireless communication device to transmit a second channel reservation signal before transmitting the first channel reservation signal. The non-transitory computer-readable medium may also include where the code for causing the first wireless communication device to transmit the second channel reservation signal is further configured to transmit the second channel reservation signal at a beginning of the first TXOP. The non-transitory computer-readable medium may also include where the code for causing the first wireless communication device to transmit the second channel reservation signal is further configured to transmit the second channel reservation signal during a channel monitoring occasion of a second set of channel monitoring occasions that is within the first TXOP, where the first set of channel monitoring occasions includes a first periodicity, and where the second set of channel monitoring occasions includes a second periodicity different from the first periodicity. The non-transitory computer-readable medium may also include where the first channel reservation signal includes first channel usage information associated with the first TXOP, and where the second channel reservation signal includes at least one of a preamble signal or second channel usage information associated with the first TXOP. The non-transitory computer-readable medium may also include where the first channel reservation signal and the second channel reservation signal reserve different portions of the TXOP. The non-transitory computer-readable medium may also include code for causing the first wireless communication device to receive a signal from the channel during a time period before the first LBT; and code for causing the first wireless communication device to determine, after passing the first LBT, whether the received signal includes a second channel reservation signal, where the code for causing the first wireless communication device to transmit the first channel reservation signal is further configured to transmit the first channel reservation signal when the received signal is determined to exclude the second channel reservation signal. The non-transitory computer-readable medium may also include code for causing the first wireless communication device to transmit, based on a second LBT, a second channel reservation signal to reserve a first portion of a second TXOP in the channel, the second channel reservation signal transmitted during a time period outside of the first set of channel monitoring occasions, the second TXOP being different from the first TXOP; code for causing the first wireless communication device to receive a signal from the channel during a time period before passing the second LBT; code for causing the first wireless communication device to determine, after passing the second LBT, whether the received signal includes a third channel reservation signal; and code for causing the first wireless communication device to refrain from communicating in a remaining portion of the second TXOP after determining that the received signal includes the third channel reservation signal. The non-transitory computer-readable medium may also include code for causing the first wireless communication device to perform the first LBT by monitoring, for a second channel reservation signal reserving a second TXOP in the channel, the second channel reservation signal monitored during one or more channel monitoring occasions of a second set of channel monitoring occasions associated with a neighboring cell, where each channel monitoring occasion of the second set of channel monitoring occasions is aligned to a start of a transmission slot. The non-transitory computer-readable medium may also include code for causing the first wireless communication device to receive a second configuration indicating the second set of channel monitoring occasions. The non-transitory computer-readable medium may also include where the code for causing the first wireless communication device to transmit the first channel reservation signal is further configured to transmit the first channel reservation signal in a physical downlink control channel (PDCCH). The non-transitory computer-readable medium may also include where the code for causing the first wireless communication device to transmit the first configuration is further configured to transmit a broadcast communication signal including the first configuration.

Further embodiments of the present disclosure include a non-transitory computer-readable medium having program code recorded thereon, the program code including code for causing a first wireless communication device to receive, from a second wireless communication device, a first configuration indicating a first set of channel monitoring occasions for a channel; and code for causing the first wireless communication device to monitor for a first channel reservation signal reserving a transmission opportunity (TXOP) in the channel, the first channel reservation signal monitored during one or more channel monitoring occasions of the first set of channel monitoring occasions based on the first configuration.

The non-transitory computer-readable medium may also include where each channel monitoring occasion of the first set of channel monitoring occasions is aligned to a start of a transmission slot. The non-transitory computer-readable medium may also include where the code for causing the first wireless communication device to monitor for the first channel reservation signal is further configured to receive the first channel reservation signal during a first channel monitoring occasion of the first set of channel monitoring occasions, and where the non-transitory computer-readable medium further includes code for causing the first wireless communication device to receive, from the second wireless communication device, a communication signal before receiving the first channel reservation signal; code for causing the first wireless communication device to receive, from the second wireless communication device, scheduling information after receiving the communication signal; and code for causing the first wireless communication device to recover data from the received communication signal based on the scheduling information. The non-transitory computer-readable medium may also include where the code for causing the first wireless communication device to monitor for the first channel reservation signal is further configured to detect channel usage information associated with the TXOP. The non-transitory computer-readable medium may also include code for causing the first wireless communication device to monitor for a second channel reservation signal, the second channel reservation signal monitored during a time period outside of the first set of channel monitoring occasions. The non-transitory computer-readable medium may also include where the code for causing the first wireless communication device to monitor for the second channel reservation signal is further configured to detect at least one of a preamble signal or channel usage information associated with the TXOP. The non-transitory computer-readable medium may also include where the code for causing the first wireless communication device to monitor for the second channel reservation signal is further configured to detect the second channel reservation signal at a beginning of the TXOP. The non-transitory computer-readable medium may also include where the code for causing the first wireless communication device to monitor for the second channel reservation signal is further configured to detect the second channel reservation signal during a channel monitoring occasion of a second set of channel monitoring occasions that is within the TXOP, where the first set of channel monitoring occasions includes a first periodicity, and where the second set of channel monitoring occasions includes a second periodicity different from the first periodicity. The non-transitory computer-readable medium may also include code for causing the first wireless communication device to refrain from communicating in the TXOP when the first channel reservation signal is detected by the monitoring. The non-transitory computer-readable medium may also include code for causing the first wireless communication device to receive, from a base station of a neighboring cell, a second configuration indicating a second set of channel monitoring occasions for the neighboring cell. The non-transitory computer-readable medium may also include code for causing the first wireless communication device to transmit, to the second wireless communication device, the second configuration, where the second wireless communication device is a serving base station of the first wireless communication device. The non-transitory computer-readable medium may also include where the code for causing the first wireless communication device to monitor for the first channel reservation signal is further configured to monitor for the first channel reservation signal in a physical downlink control channel (PDCCH). The non-transitory computer-readable medium may also include where the code for causing the first wireless communication device to receive the first configuration is further configured to receive, from the second wireless communication device, a broadcast communication signal including the first configuration.

Further embodiments of the present disclosure include an apparatus including means for transmitting a first configuration indicating a first set of channel monitoring occasions for a channel; means for transmitting, based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and means for communicating, with a wireless communication device, a first communication signal in the channel during the first TXOP.

The apparatus may also include where each channel monitoring occasion of the first set of channel monitoring occasions is aligned to a start of a transmission slot. The apparatus may also include where the first TXOP includes a partial transmission slot at a beginning of the TXOP followed by one or more full transmission slots, and where the first channel monitoring occasion is located within a first full transmission slot of the one or more full transmission slots. The apparatus may also include where the means for communicating the first communication signal is further configured to transmit, to the wireless communication device, the first communication signal before communicating the first channel reservation signal. The apparatus may also include further includes means for transmitting, to the wireless communication device, scheduling information associated with the first communication signal during the first channel monitoring occasion. The apparatus may also include means for transmitting a second channel reservation signal before transmitting the first channel reservation signal. The apparatus may also include where the means for transmitting the second channel reservation signal is further configured to transmit the second channel reservation signal at a beginning of the first TXOP. The apparatus may also include where the means for transmitting the second channel reservation signal is further configured to transmit the second channel reservation signal during a channel monitoring occasion of a second set of channel monitoring occasions that is within the first TXOP, where the first set of channel monitoring occasions includes a first periodicity, and where the second set of channel monitoring occasions includes a second periodicity different from the first periodicity. The apparatus may also include where the first channel reservation signal includes first channel usage information associated with the first TXOP, and where the second channel reservation signal includes at least one of a preamble signal or second channel usage information associated with the first TXOP. The apparatus may also include where the first channel reservation signal and the second channel reservation signal reserve different portions of the TXOP. The apparatus may also include means for receiving a signal from the channel during a time period before the first LBT; and means for determining, after passing the first LBT, whether the received signal includes a second channel reservation signal, where the means for transmitting the first channel reservation signal is further configured to transmitting the first channel reservation signal when the received signal is determined to exclude the second channel reservation signal. The apparatus may also include means for transmitting, based on a second LBT, a second channel reservation signal to reserve a first portion of a second TXOP in the channel, the second channel reservation signal transmitted during a time period outside of the first set of channel monitoring occasions, the second TXOP being different from the first TXOP; means for receiving a signal from the channel during a time period before passing the second LBT; means for determining, after passing the second LBT, whether the received signal includes a third channel reservation signal; and means for refraining from communicating in a remaining portion of the second TXOP after determining that the received signal includes the third channel reservation signal. The apparatus may also include means for performing the first LBT by monitoring, for a second channel reservation signal reserving a second TXOP in the channel, the second channel reservation signal monitored during one or more channel monitoring occasions of a second set of channel monitoring occasions associated with a neighboring cell, where each channel monitoring occasion of the second set of channel monitoring occasions is aligned to a start of a transmission slot. The apparatus may also include means for receiving a second configuration indicating the second set of channel monitoring occasions. The apparatus may also include where the means for transmitting the first channel reservation signal is further configured to transmit the first channel reservation signal in a physical downlink control channel (PDCCH). The apparatus may also include where the means for transmitting the first configuration is further configured to transmit a broadcast communication signal including the first configuration.

Further embodiments of the present disclosure include An apparatus having program code recorded thereon, the program code including means for receiving, from a wireless communication device, a first configuration indicating a first set of channel monitoring occasions for a channel; and means for monitoring for a first channel reservation signal reserving a transmission opportunity (TXOP) in the channel, the first channel reservation signal monitored during one or more channel monitoring occasions of the first set of channel monitoring occasions based on the first configuration.

The apparatus may also include where each channel monitoring occasion of the first set of channel monitoring occasions is aligned to a start of a transmission slot. The apparatus may also include where the means for monitoring for the first channel reservation signal is further configured to receive the first channel reservation signal during a first channel monitoring occasion of the first set of channel monitoring occasions, and where the apparatus further includes means for receiving, from the wireless communication device, a communication signal before receiving the first channel reservation signal; means for receiving, from the wireless communication device, scheduling information after receiving the communication signal; and means for recovering data from the received communication signal based on the scheduling information. The apparatus may also include where the means for monitoring for the first channel reservation signal is further configured to detect channel usage information associated with the TXOP. The apparatus may also include means for monitoring for a second channel reservation signal, the second channel reservation signal monitored during a time period outside of the first set of channel monitoring occasions. The apparatus may also include where the means for monitoring for the second channel reservation signal is further configured to detect at least one of a preamble signal or channel usage information associated with the TXOP. The apparatus may also include where the means for monitoring for the second channel reservation signal is further configured to detect the second channel reservation signal at a beginning of the TXOP. The apparatus may also include where the means for monitoring for the second channel reservation signal is further configured to detect the second channel reservation signal during a channel monitoring occasion of a second set of channel monitoring occasions that is within the TXOP, where the first set of channel monitoring occasions includes a first periodicity, and where the second set of channel monitoring occasions includes a second periodicity different from the first periodicity. The apparatus may also include means for refraining from communicating in the TXOP when the first channel reservation signal is detected by the monitoring. The apparatus may also include means for receiving, from a base station of a neighboring cell, a second configuration indicating a second set of channel monitoring occasions for the neighboring cell. The apparatus may also include means for transmitting, to the wireless communication device, the second configuration, where the wireless communication device is a serving base station of the apparatus. The apparatus may also include where the means for monitoring for the first channel reservation signal is further configured to monitor for the first channel reservation signal in a physical downlink control channel (PDCCH). The apparatus may also include where the means for receiving the first configuration is further configured to receive, from the wireless communication device, a broadcast communication signal including the first configuration.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   transmitting, by a first wireless communication device, a first configuration indicating a first set of channel monitoring occasions for a channel, wherein each channel monitoring occasion of the first set of channel monitoring occasions is aligned to a start of a transmission slot;
   transmitting, by the first wireless communication device based on a first listen-before-talk (LBT) in the channel, a first channel reservation signal to reserve a first transmission opportunity (TXOP) in the channel, the first channel reservation signal transmitted during a first channel monitoring occasion of the first set of channel monitoring occasions that is within the first TXOP; and
   communicating, by the first wireless communication device with a second wireless communication device, a first communication signal in the channel during the first TXOP.

2. The method of claim 1, wherein the first TXOP includes a partial transmission slot at a beginning of the TXOP followed by one or more full transmission slots, and wherein the first channel monitoring occasion is located within a first full transmission slot of the one or more full transmission slots.

3. The method of claim 1, wherein:
   the communicating includes:
      transmitting, by the first wireless communication device to the second wireless communication device, the first communication signal before transmitting the first channel reservation signal; and
   the method further comprises:
      transmitting, by the first wireless communication device to the second wireless communication device, scheduling information associated with the first communication signal during the first channel monitoring occasion.

4. The method of claim 1, further comprising:
   transmitting, by the first wireless communication device, a second channel reservation signal before transmitting the first channel reservation signal, wherein the first channel reservation signal and the second channel reservation signal reserve different portions of the first TXOP.

5. The method of claim 4, wherein the transmitting the second channel reservation signal includes:
   transmitting, by the first wireless communication device, the second channel reservation signal at a beginning of the first TXOP.

6. The method of claim 4, wherein the transmitting the second channel reservation signal includes:
   transmitting, by the first wireless communication device, the second channel reservation signal during a channel monitoring occasion of a second set of channel monitoring occasions that is within the first TXOP,
   wherein the first set of channel monitoring occasions includes a first periodicity, and
   wherein the second set of channel monitoring occasions includes a second periodicity different from the first periodicity.

7. The method of claim 4, wherein the first channel reservation signal includes first channel usage information associated with the first TXOP, and wherein the second channel reservation signal includes at least one of a preamble signal or second channel usage information associated with the first TXOP.

8. The method of claim 1, further comprising:
   receiving, by the first wireless communication device, a signal from the channel during a time period before the first LBT; and determining, by the first wireless communication device after passing the first LBT, whether the received signal includes a second channel reservation signal, wherein the transmitting the first channel reservation signal includes:

transmitting, by the first wireless communication device, the first channel reservation signal when the received signal is determined to exclude the second channel reservation signal.

9. The method of claim 1, further comprising:

transmitting, by the first wireless communication device based on a second LBT, a second channel reservation signal to reserve a first portion of a second TXOP in the channel, the second channel reservation signal transmitted during a time period outside of the first set of channel monitoring occasions, the second TXOP being different from the first TXOP;

receiving, by the first wireless communication device, a signal from the channel during a time period before passing the second LBT;

determining, by the first wireless communication device after passing the second LBT, whether the received signal includes a third channel reservation signal; and refraining, by the first wireless communication device, from communicating in a remaining portion of the second TXOP after determining that the received signal includes the third channel reservation signal.

10. The method of claim 1, further comprising:

receiving, by the first wireless communication device, a second configuration indicating a second set of channel monitoring occasions associated with a neighboring cell, wherein each channel monitoring occasion of the second set of channel monitoring occasions is aligned to a start of a transmission slot; and performing, by the first wireless communication device, the first LBT by monitoring, for a second channel reservation signal reserving a second TXOP in the channel, the second channel reservation signal monitored during one or more channel monitoring occasions of the second set of channel monitoring occasions.

11. The method of claim 1, wherein the transmitting the first channel reservation signal includes:

transmitting, by the first wireless communication device, the first channel reservation signal in a physical downlink control channel (PDCCH).

12. The method of claim 1, wherein the transmitting the first configuration includes:

transmitting, by the first wireless communication device, a broadcast communication signal including the first configuration.

13. A method of wireless communication, comprising:

receiving, by a first wireless communication device from a second wireless communication device, a first configuration indicating a first set of channel monitoring occasions for a channel wherein each channel monitoring occasion of the first set of channel monitoring occasions is aligned to a start of a transmission slot; and monitoring, by the first wireless communication device, for a first channel reservation signal reserving a transmission opportunity (TXOP) in the channel, the first channel reservation signal monitored during one or more channel monitoring occasions of the first set of channel monitoring occasions based on the first configuration.

14. The method of claim 13, wherein the monitoring includes:

receiving, by the first wireless communication device, the first channel reservation signal during a first channel monitoring occasion of the first set of channel monitoring occasions, and wherein the method further comprises:

receiving, by the first wireless communication device from the second wireless communication device, a communication signal before receiving the first channel reservation signal;

receiving, by the first wireless communication device from the second wireless communication device, scheduling information after receiving the communication signal; and recovering, by the first wireless communication device, data from the received communication signal based on the scheduling information.

15. The method of claim 13, wherein the monitoring includes:

detecting, by the first wireless communication device, channel usage information associated with the TXOP.

16. The method of claim 13, further comprising:

monitoring, by the first wireless communication device, for a second channel reservation signal, the second channel reservation signal monitored during a time period outside of the first set of channel monitoring occasions.

17. The method of claim 16, wherein the monitoring for the second channel reservation signal includes:

detecting, by the first wireless communication device, at least one of a preamble signal or channel usage information associated with the TXOP.

18. The method of claim 16, wherein the monitoring for the second channel reservation signal includes:

detecting, by the first wireless communication device, the second channel reservation signal at a beginning of the TXOP.

19. The method of claim 16, wherein the monitoring for the second channel reservation signal includes:

detecting, by the first wireless communication device, the second channel reservation signal during a channel monitoring occasion of a second set of channel monitoring occasions that is within the TXOP, wherein the first set of channel monitoring occasions includes a first periodicity, and wherein the second set of channel monitoring occasions includes a second periodicity different from the first periodicity.

20. The method of claim 13, further comprising:

receiving, by the first wireless communication device from a base station of a neighboring cell, a second configuration indicating a second set of channel monitoring occasions for the neighboring cell.

21. The method of claim 20, further comprising:

transmitting, by the first wireless communication device to the second wireless communication device, the second configuration, wherein the second wireless communication device is a serving base station of the first wireless communication device.

22. The method of claim 13, wherein the monitoring includes:

monitoring, by the first wireless communication device, for the first channel reservation signal in a physical downlink control channel (PDCCH).

23. The method of claim 13, wherein the receiving includes:
  receiving, by the first wireless communication device from the second wireless communication device, a broadcast communication signal including the first configuration.

24. An apparatus comprising:
a transceiver configured to:
  transmit a first configuration indicating a set of channel monitoring occasions for a channel, wherein each channel monitoring occasion of the set of channel monitoring occasions is aligned to a start of a transmission slot;
  transmit, based on a first listen-before-talk (LBT) in the channel, a first channel reservation signal to reserve a first transmission opportunity (TXOP) in the channel, the first channel reservation signal transmitted during a first channel monitoring occasion of the set of channel monitoring occasions that is within the first TXOP; and
  communicate, with a wireless communication device, a first communication signal in the channel during the first TXOP.

25. The apparatus of claim 24, wherein the first TXOP includes a partial transmission slot at a beginning of the TXOP followed by one or more full transmission slots, and wherein the first channel monitoring occasion is located within a first full transmission slot of the one or more full transmission slots.

26. The apparatus of claim 24, wherein:
the transceiver configured to communicate the first communication signal is further configured to:
  transmit the first communication signal before transmitting the first channel reservation signal; and
the transceiver is further configured to:
  transmit, to the wireless communication device, scheduling information associated with the first communication signal during the first channel monitoring occasion.

27. The apparatus of claim 24, wherein the transceiver is further configured to:
  transmit a second channel reservation signal at a beginning of the first TXOP before transmitting the first channel reservation signal, wherein the first channel reservation signal includes first channel usage information associated with the first TXOP, and wherein the second channel reservation signal includes at least one of a preamble signal or second channel usage information associated with the first TXOP.

28. An apparatus comprising:
a transceiver configured to receive, from a wireless communication device, a first configuration indicating a set of channel monitoring occasions for a channel, wherein each channel monitoring occasion of the set of channel monitoring occasions is aligned to a start of a transmission slot; and
a processor configured to monitor for a first channel reservation signal reserving a transmission opportunity (TXOP) in the channel, the first channel reservation signal monitored during one or more channel monitoring occasions of the set of channel monitoring occasions based on the first configuration.

29. The apparatus of claim 28,
wherein the transceiver is further configured to:
  receive the first channel reservation signal during a first channel monitoring occasion of the set of channel monitoring occasions by the monitoring;
  receive, from the wireless communication device, a communication signal before receiving the first channel reservation signal; and
  receive, from the wireless communication device, scheduling information after receiving the communication signal, and
wherein the processor is further configured to recover data from the received communication signal based on the scheduling information.

30. The apparatus of claim 28, wherein the processor is further configured to:
  monitor for a second channel reservation signal during a time period outside of the set of channel monitoring occasions;
  detect the first channel reservation signal during a first channel monitoring occasion of the set of channel monitoring occasions from the monitoring for the first channel reservation signal, the first channel reservation signal including first channel usage information associated with the TXOP; and
  detect the second channel reservation signal at a beginning of the TXOP from the monitoring for the second channel reservation signal, the second channel reservation signal including at least one of a preamble signal or second channel usage information associated with the TXOP.

* * * * *